(12) United States Patent
Kraenzle

(10) Patent No.: US 8,870,027 B2
(45) Date of Patent: Oct. 28, 2014

(54) MULTI-BOTTLE CONTAINERS FOR DISPENSING MEASURED QUANTITIES OF LIQUIDS

(76) Inventor: David G. Kraenzle, St. Louis, MO (US)

(*) Notice: Subject to any disclaimer, the term of this patent is extended or adjusted under 35 U.S.C. 154(b) by 132 days.

(21) Appl. No.: 13/420,853

(22) Filed: Mar. 15, 2012

(65) Prior Publication Data

US 2013/0240563 A1  Sep. 19, 2013

(51) Int. Cl.
*B67D 7/74* (2010.01)
*B65D 21/02* (2006.01)
*B65D 21/04* (2006.01)

(52) U.S. Cl.
CPC ............ *B65D 21/0201* (2013.01); *B65D 21/04* (2013.01)
USPC .................................. 222/129; 222/94; 215/6

(58) Field of Classification Search
CPC ............... B65D 21/02; B65D 21/0201; B65D 21/0202; B65D 21/0204; B65D 21/0233; B65D 21/04; B65D 21/0228
USPC ................... 222/129, 94; 215/6, 10; 220/507, 220/23.2–23.8
See application file for complete search history.

(56) References Cited

U.S. PATENT DOCUMENTS

| | | | |
|---|---|---|---|
| 2,665,816 A | 1/1954 | Anft | |
| 3,194,426 A | 7/1965 | Brown, Jr. | |
| 3,269,389 A * | 8/1966 | Meurer et al. ............ | 128/200.14 |
| 3,347,420 A * | 10/1967 | Donoghue .................... | 222/129 |
| 3,581,953 A | 6/1971 | Donoghue | |
| 4,196,808 A | 4/1980 | Pardo | |
| D288,662 S | 3/1987 | Obuchowski | |
| D324,995 S * | 3/1992 | Yan ................................ | D9/743 |
| 5,125,543 A | 6/1992 | Rohrabacher et al. | |
| 5,154,917 A | 10/1992 | Ibrahim et al. | |
| 5,158,191 A | 10/1992 | Douglas et al. | |
| 5,223,245 A | 6/1993 | Ibrahim et al. | |
| 5,316,159 A | 5/1994 | Douglas et al. | |
| 5,346,097 A | 9/1994 | Melland et al. | |
| 5,356,040 A * | 10/1994 | Reggiani ....................... | 222/129 |
| 5,392,947 A | 2/1995 | Gentile | |
| 5,482,170 A | 1/1996 | Semersky et al. | |
| 5,573,143 A * | 11/1996 | Deardurff et al. ........ | 222/153.14 |
| 5,607,072 A | 3/1997 | Rigney et al. | |
| 5,740,947 A * | 4/1998 | Flaig et al. .................... | 222/135 |
| 5,804,227 A | 9/1998 | Deardurff et al. | |
| 5,823,391 A | 10/1998 | Klauke et al. | |
| 5,833,124 A | 11/1998 | Groves et al. | |
| 5,862,949 A | 1/1999 | Markey et al. | |
| 5,954,213 A | 9/1999 | Gerhart et al. | |
| 6,223,942 B1 | 5/2001 | Markey et al. | |
| D445,672 S | 7/2001 | Sherman et al. | |
| 6,325,229 B1 * | 12/2001 | Anders ....................... | 220/23.4 |
| 6,390,324 B1 | 5/2002 | Everette et al. | |

(Continued)

*Primary Examiner* — Lien Ngo

(57) ABSTRACT

According to various aspects, exemplary embodiments are provided of multi-bottle containers and apparatus for dispensing liquids. In an exemplary embodiment, a container includes a first bottle and a second bottle coupled to the first bottle. The first bottle has a first reservoir for holding a first liquid and a first opening for dispensing the first liquid from within the first reservoir. The second bottle has a second reservoir for holding a second liquid and a second opening for dispensing the second liquid from within the second reservoir. An insert may be disposed between the bottles, which may be configured to inhibit flexing of one bottle without the other bottle to thereby help compensate for differences in pressure applied to one bottle relative to the other bottle when the container is squeezed and help the bottles dispense more equally.

59 Claims, 20 Drawing Sheets

(56) References Cited

U.S. PATENT DOCUMENTS

| | | |
|---|---|---|
| 6,419,783 B1 | 7/2002 | Rainey et al. |
| D472,150 S | 3/2003 | Yourist |
| 6,758,411 B2 | 7/2004 | Conway et al. |
| 6,857,530 B2 | 2/2005 | Yourist |
| 6,913,777 B2 | 7/2005 | Rebhorn et al. |
| D517,866 S | 3/2006 | Burks |
| D539,167 S | 3/2007 | Garrett |
| D556,058 S * | 11/2007 | Bowers et al. .............. D9/743 |
| D585,277 S | 1/2009 | Beauplan |
| 8,523,469 B2 * | 9/2013 | Abergel .................... 401/35 |
| 2004/0026535 A1 * | 2/2004 | Conway et al. ............. 239/433 |
| 2005/0098527 A1 * | 5/2005 | Yates, III .................. 215/6 |

* cited by examiner

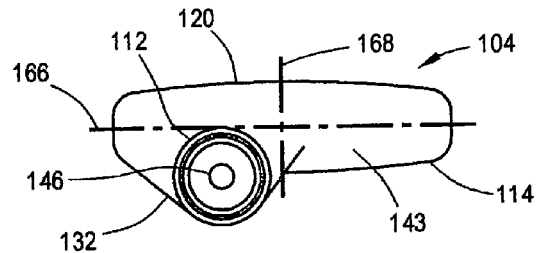
FIG. 7
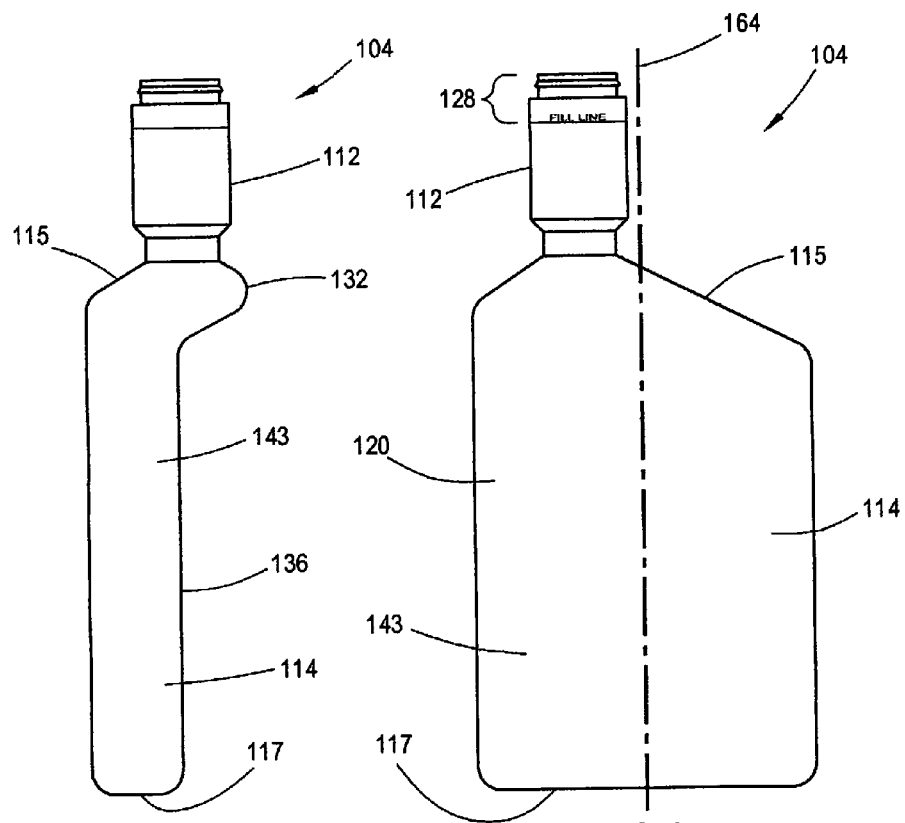
FIG. 5
FIG. 6

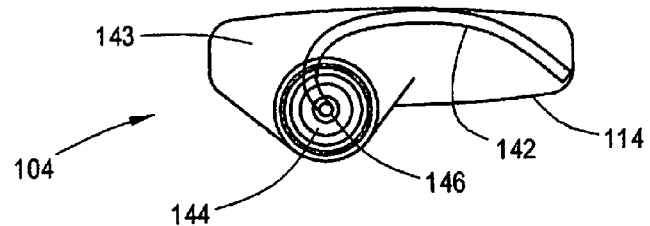
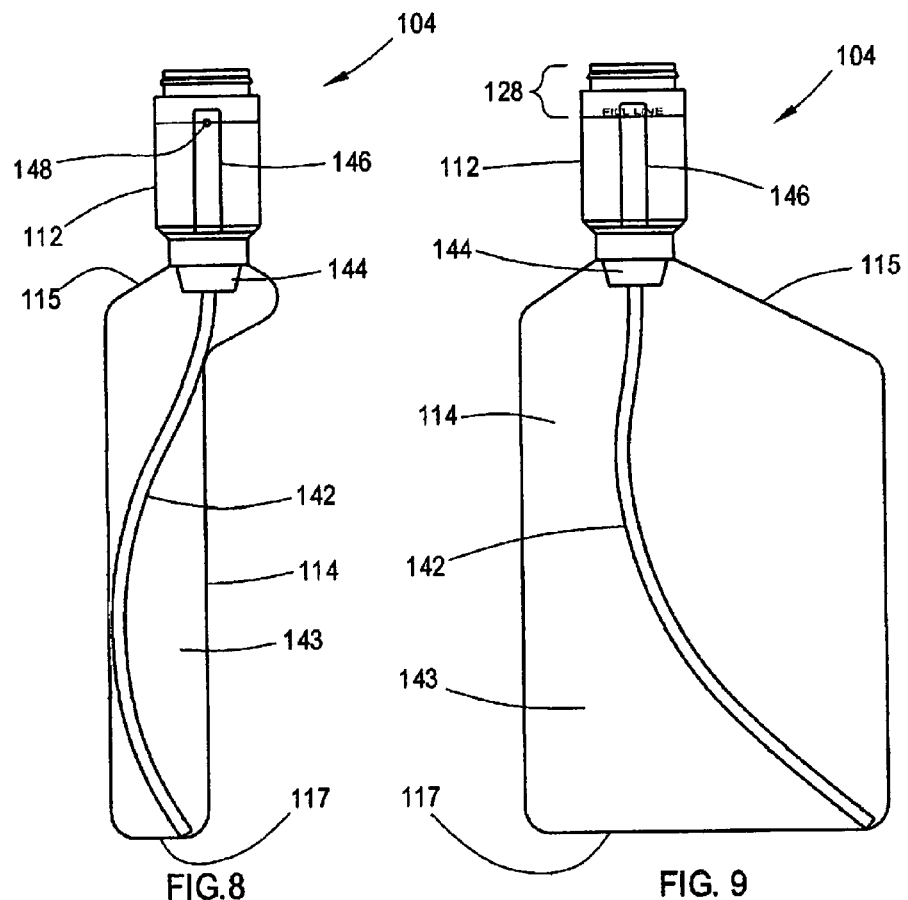

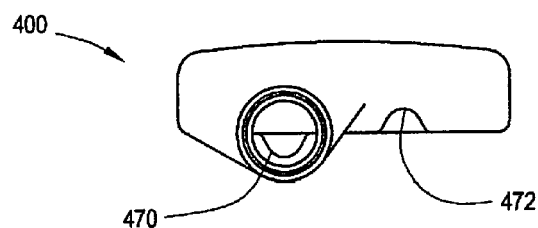
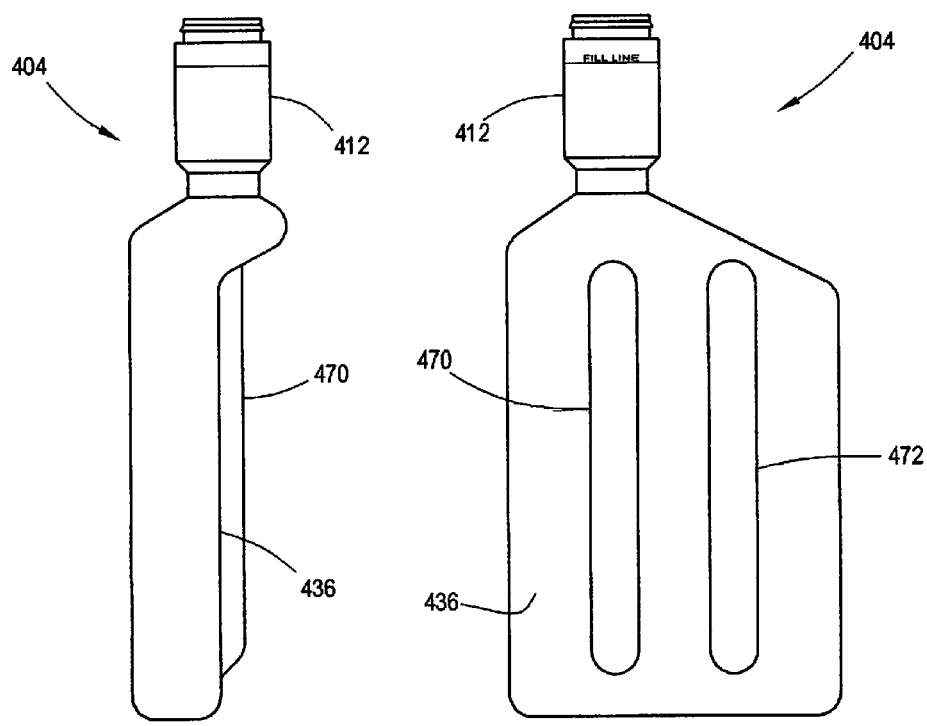
FIG. 18
FIG. 16  FIG. 17

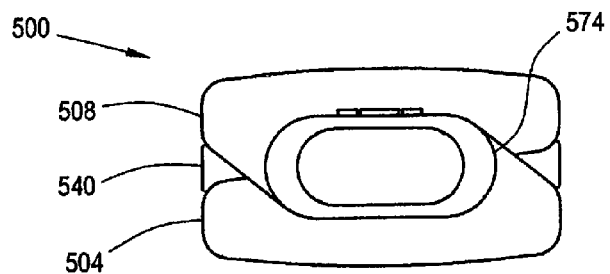
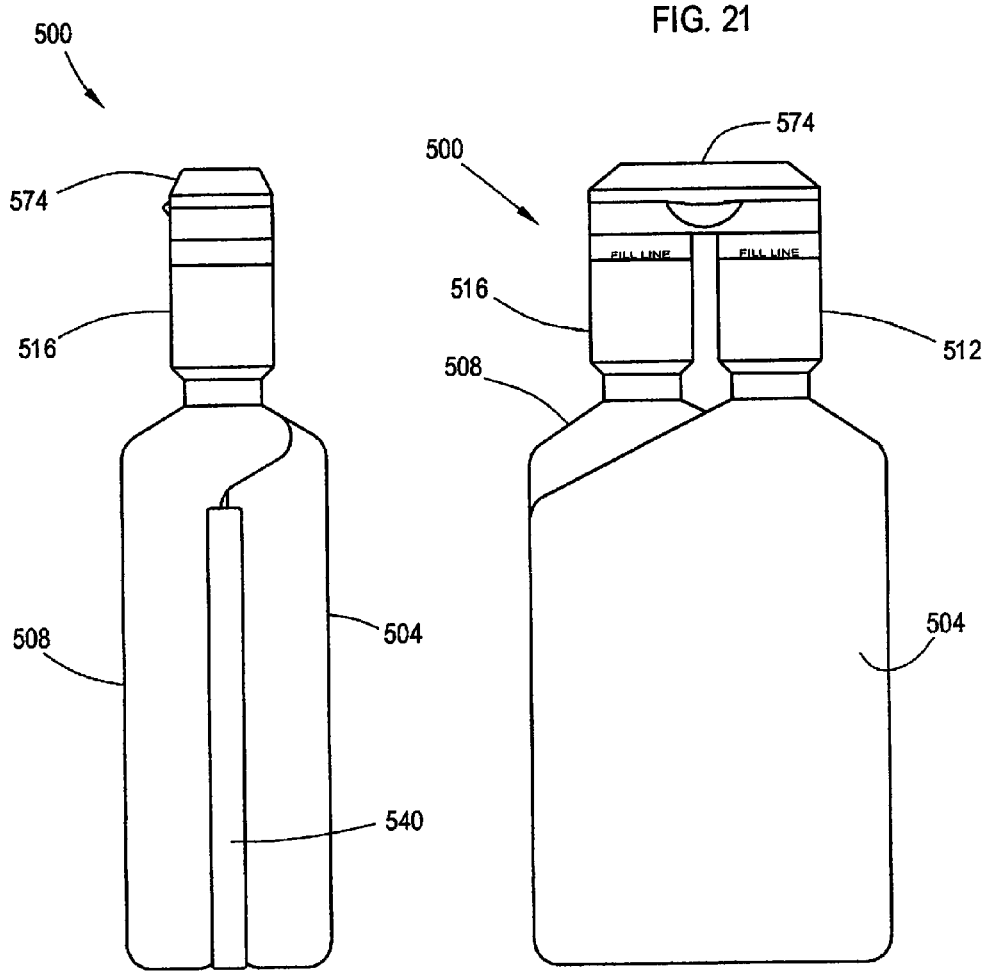
FIG. 21
FIG. 20
FIG. 19

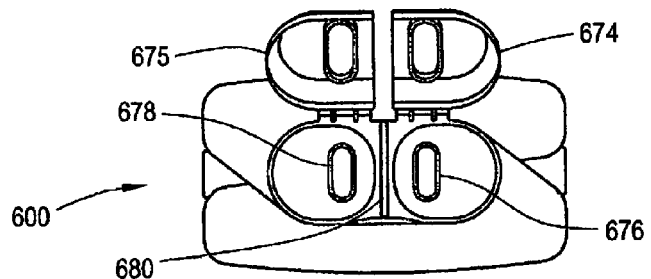
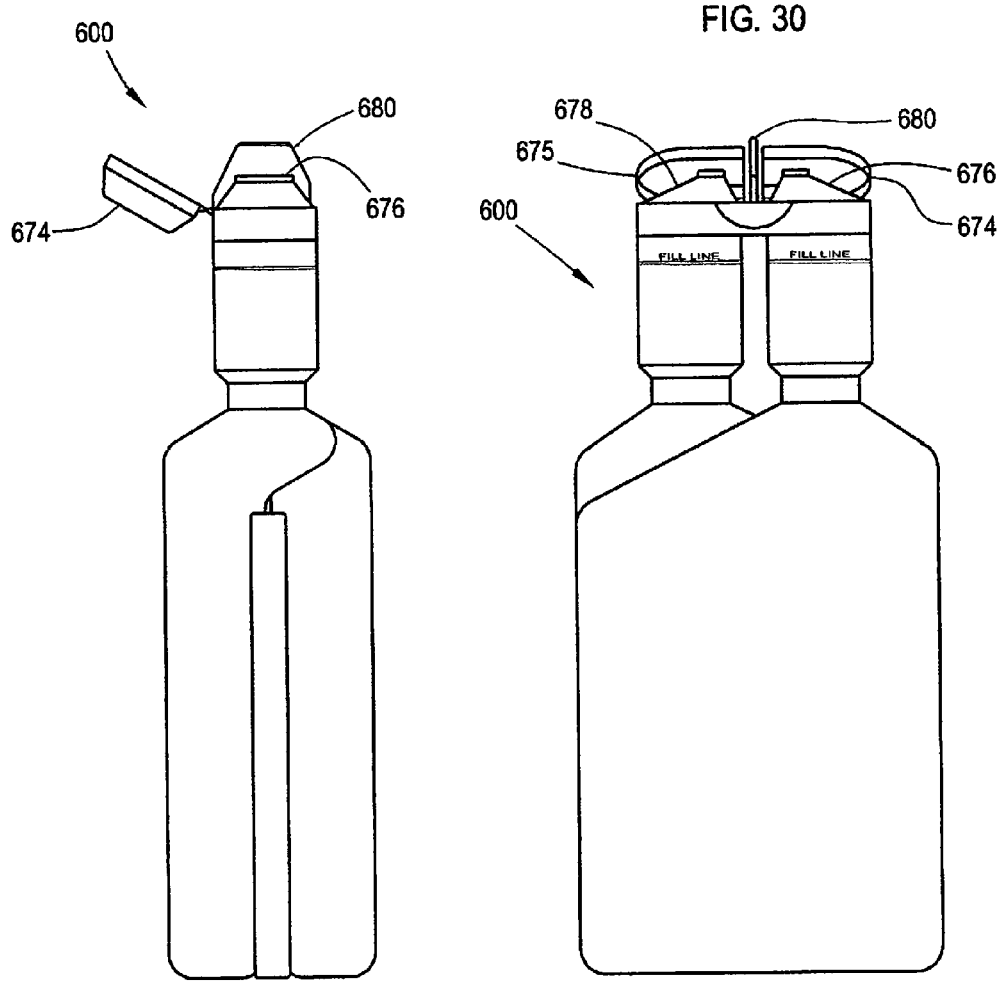
FIG. 30
FIG. 29  FIG. 28

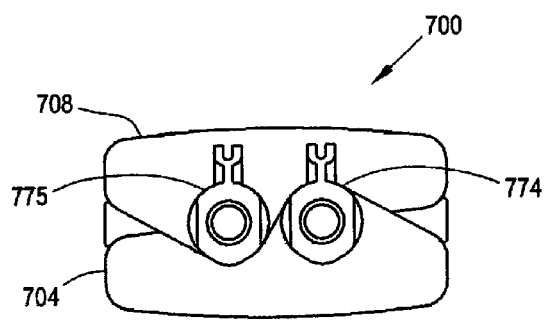
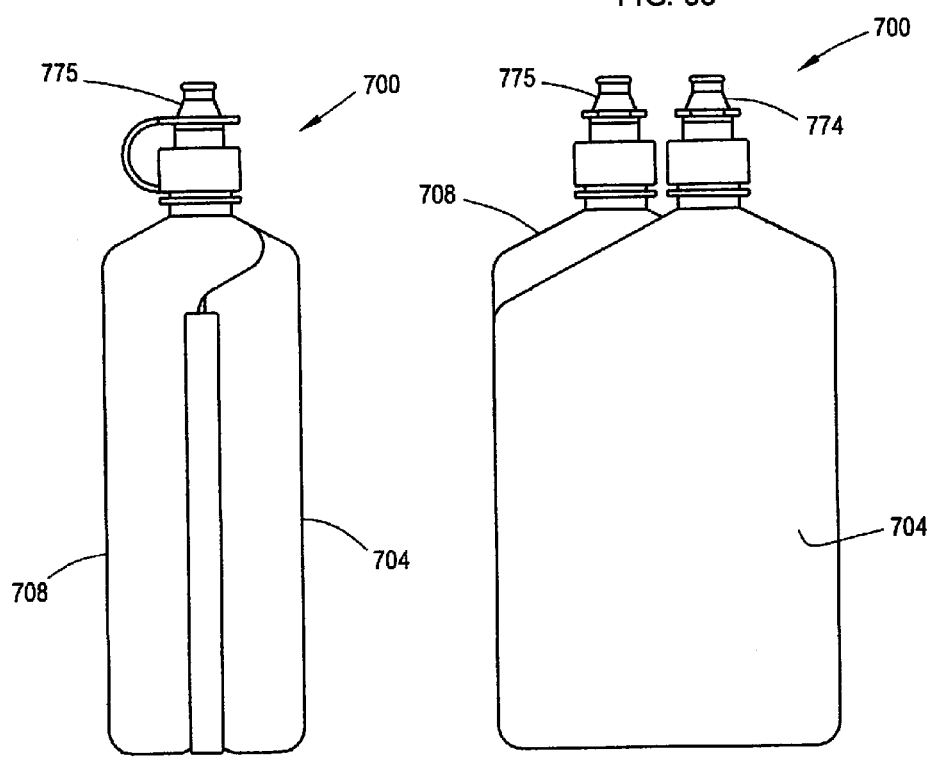
FIG. 33
FIG. 32
FIG. 31

MULTI-BOTTLE CONTAINERS FOR DISPENSING MEASURED QUANTITIES OF LIQUIDS

FIELD

The present disclosure relates to multi-bottle containers for dispensing measured quantities of liquids.

BACKGROUND

This section provides background information related to the present disclosure which is not necessarily prior art.

It is common for different liquids to be used together, e.g., two component mouth rinses, two part cleaning solutions, etc. The different liquids are sometimes stored and dispensed from separate individual containers. But other times, the different liquids may be stored and dispensed from separate compartments of the same container.

SUMMARY

This section provides a general summary of the disclosure, and is not a comprehensive disclosure of its full scope or all of its features.

According to various aspects, exemplary embodiments are disclosed of multi-bottle containers and apparatus for dispensing liquids. In an exemplary embodiment, a container includes a first bottle and a second bottle coupled to the first bottle. Each bottle includes a reservoir for holding a liquid, an opening for dispensing liquid from within the reservoir, and an inner wall facing in a direction towards the other bottle. Each bottle also includes a mating surface configured to accept a mating surface of the other bottle, and with at least a portion of the mating surface overlapping the inner wall of the other bottle. The first and second bottles are configured such that their openings are side by side with at least a portion of the opening of the first bottle overlapping the inner wall of the second bottle and with at least a portion of the opening of the second bottle overlapping the inner wall of the first bottle.

Another exemplary embodiment includes an apparatus for dispensing measured quantities of liquids. In this exemplary embodiment, the apparatus includes a first container and a second container. Each container includes a body defining a reservoir for holding a liquid and an opening for dispensing liquid from within the reservoir. The opening includes at least a portion outside an outline defined by the body as viewed from above when the container is upright. The first and second containers are configured such that their openings are side by side when the first and second containers are coupled.

In another exemplary embodiment, a container includes a first bottle and a second bottle coupled to the first bottle. The first bottle has a first reservoir for holding a first liquid and a first opening for dispensing the first liquid from within the first reservoir. The second bottle has a second reservoir for holding a second liquid and a second opening for dispensing the second liquid from within the second reservoir. An insert is between the first and second bottles. The insert is configured to inhibit flexing of one bottle without the other bottle to thereby help compensate for differences in pressure applied by to one bottle relative to the other bottle when the container is squeezed and help the first and second bottles dispense more equally.

In another exemplary embodiment, a container includes a first bottle and a second bottle coupled to the first bottle. Each bottle includes a body defining a reservoir for holding a liquid, an opening for dispensing liquid from within the reservoir, and a mating surface configured to accept a mating surface of the other bottle. The first and second bottles are configured such that their openings are side by side at least partially within a vertical plane through an axis of the container that extends between opposing sides of the container when upright, which vertical plane passes through at least a portion of the mating surfaces of the first and second bottles.

In another exemplary embodiment, a container includes a first bottle and a second bottle coupled to the first bottle. The first bottle includes a first reservoir for holding a first liquid and a first opening for dispensing the first liquid from within the first reservoir. The second bottle includes a second reservoir for holding a second liquid and a second opening for dispensing the second liquid from within the second reservoir. Each bottle includes an inner wall facing in a direction towards the other bottle. The inner walls of the first and second bottles are reinforced by ribs that are configured to inhibit flexing of one bottle without the other bottle to thereby help compensate for differences in pressure applied to one bottle relative to the other bottle when the container is squeezed and help the first and second bottles dispense more equally.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a side view of the bottle shown in FIG. 4;

FIG. 6 is a front view of the bottle shown in FIG. 4, and illustrating an inner wall of the bottle;

FIG. 7 is a top view of the bottle shown in FIG. 4;

FIG. 8 is a side view of the bottle shown in FIG. 4, and now further illustrating components of an exemplary liquid transfer system that may be used within the bottle for transferring liquid from the bottle's reservoir to its measuring well according to an exemplary embodiment;

FIG. 9 is a right side view of the bottle shown in FIG. 8, and illustrating an inner wall of the bottle;

FIG. 10 is a top view of the bottle shown in FIG. 8;

FIG. 16 is a side view of the bottle shown in FIG. 15;

FIG. 17 is a front view of the bottle shown in FIG. 15, and illustrating an inner wall of the bottle as well and also illustrating features along the inner wall of the bottle;

FIG. 18 is a top view of the bottle shown in FIG. 15;

FIG. 19 is a front view of another exemplary embodiment of a dual bottle container including a hinged closure or cap shown in a closed position;

FIG. 20 is a side view of the dual bottle container shown in FIG. 19 and also illustrating the insert between the two bottles;

FIG. 21 is a top view of the dual bottle container shown in FIG. 19;

FIG. 28 is another front view of the dual bottle container bottle shown in FIG. 25 after each cap has been opened and further illustrating exemplary spouts for dispensing liquids from the measuring wells;

FIG. 29 is another side view of the dual bottle container shown in FIG. 26 after the cap has been opened and also illustrating an exemplary cross-contamination barrier or divider between the two spouts;

FIG. 30 is another top view of the dual bottle container shown in FIG. 27 after each cap has been opened;

FIG. 31 is a front view of another exemplary embodiment of a dual bottle container including nozzles (or spouts) for dispensing liquid from the bottles when the container is squeezed, and also illustrating a closure or cap shown closed over each nozzle, which pair of caps may be opened or closed independent of each other;

FIG. 32 is a side view of the dual bottle container shown in FIG. 31 and also illustrating the insert between the two bottles;

FIG. 33 is another top view of the dual bottle container shown in FIG. 31; and

Figure 34:
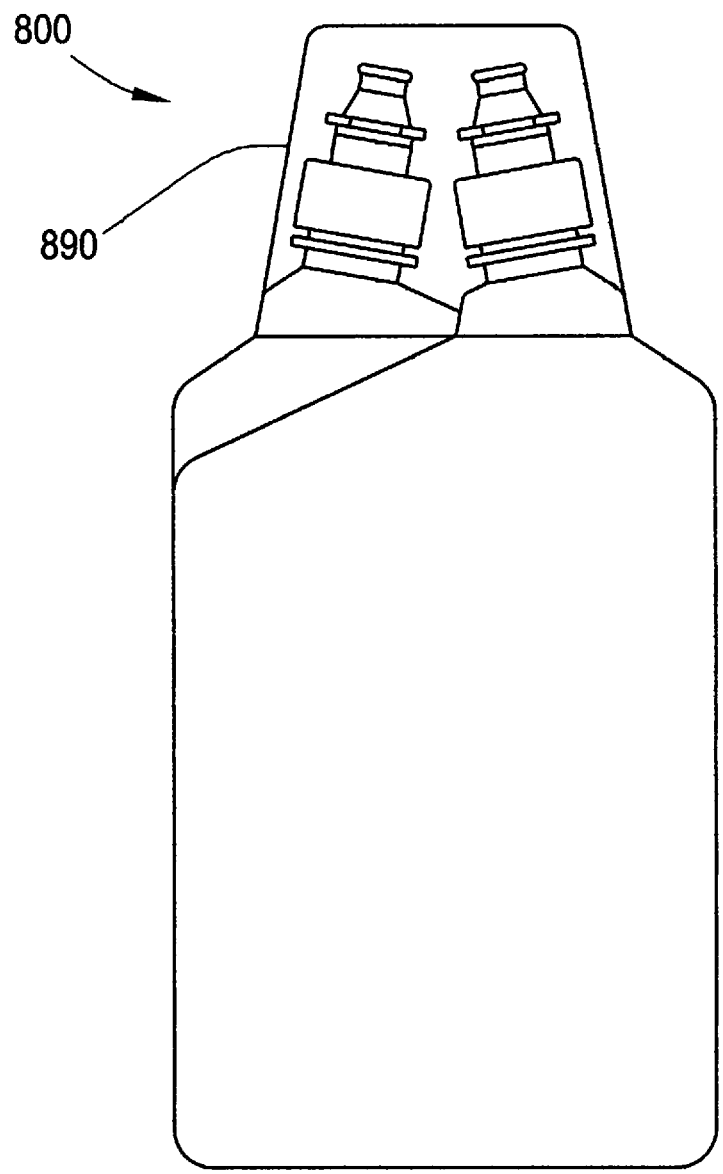

FIG. 34 is a front view of another exemplary embodiment of a dual bottle container including nozzles (or spouts) angled inwardly toward each other such that the liquids dispensed from the nozzles will converge or mix, and also illustrating a closure or cap shown closed over each nozzle, which pair of caps may be opened or closed independent of each other, and an over-cap positioned over the caps and nozzles which may be removed and used as a measuring and/or mixing vessel for the liquids dispensed from the nozzles in the cup.

Corresponding reference numerals indicate corresponding parts throughout the several views of the drawings.

DETAILED DESCRIPTION

Example embodiments will now be described more fully with reference to the accompanying drawings.

According to various aspects, exemplary embodiments are disclosed of multi-bottle containers and apparatus for dispensing liquids. According to other aspects, exemplary embodiments are disclosed of methods relating to multi-bottle containers or liquid dispensing apparatus. For example, disclosed herein are exemplary embodiments of methods of making multi-bottle containers or liquid dispensing apparatus. Also disclosed herein are exemplary embodiments of methods of using multi-bottle containers or liquid dispensing apparatus.

With reference now to the figures, FIGS. 1 through 3A illustrate an exemplary embodiment of a dual bottle container or liquid dispensing apparatus 100 embodying one or more aspects of the present disclosure. As shown, the dual bottle container 100 includes first and second bottles 104, 108. The first bottle 104 includes a first measuring well or dispensing chamber 112 and a first body 114. The second bottle 108 includes a second measuring well or dispensing chamber 116 and a second body 118. Each body 114, 118 defines a reservoir, which is the main content holding portion for the respective bottle 104, 108 between that bottle's shoulders and its base or bottom. For example, and with reference to FIG. 3A, the body of 114 of the bottle 104 extends generally between the shoulders 115 and the base or bottom 117 of the bottle 104.

The first and second bottles 104, 108 are identical in this exemplary embodiment, such that a description of the first and second bottles will be the same. Using two identical bottles in exemplary embodiments allows for production with only one mold. Other exemplary embodiments may include non-identical bottles, such as two bottles that are similar, substantially the same, or have different configurations. For example, one bottle may be colored differently or made of different material than the other bottle, for example, to help a user more quickly discern which bottle contains which liquid, etc. As another example, one bottle may be larger than the other if the two liquids will be dispensed in different measured amounts so that both bottles will become empty after the same number of uses. As a further example, the measuring wells or dispensing chambers may be configured differently (e.g., sized differently, shaped differently, configured for dispensing different amounts of liquid, etc.).

Figure 1:
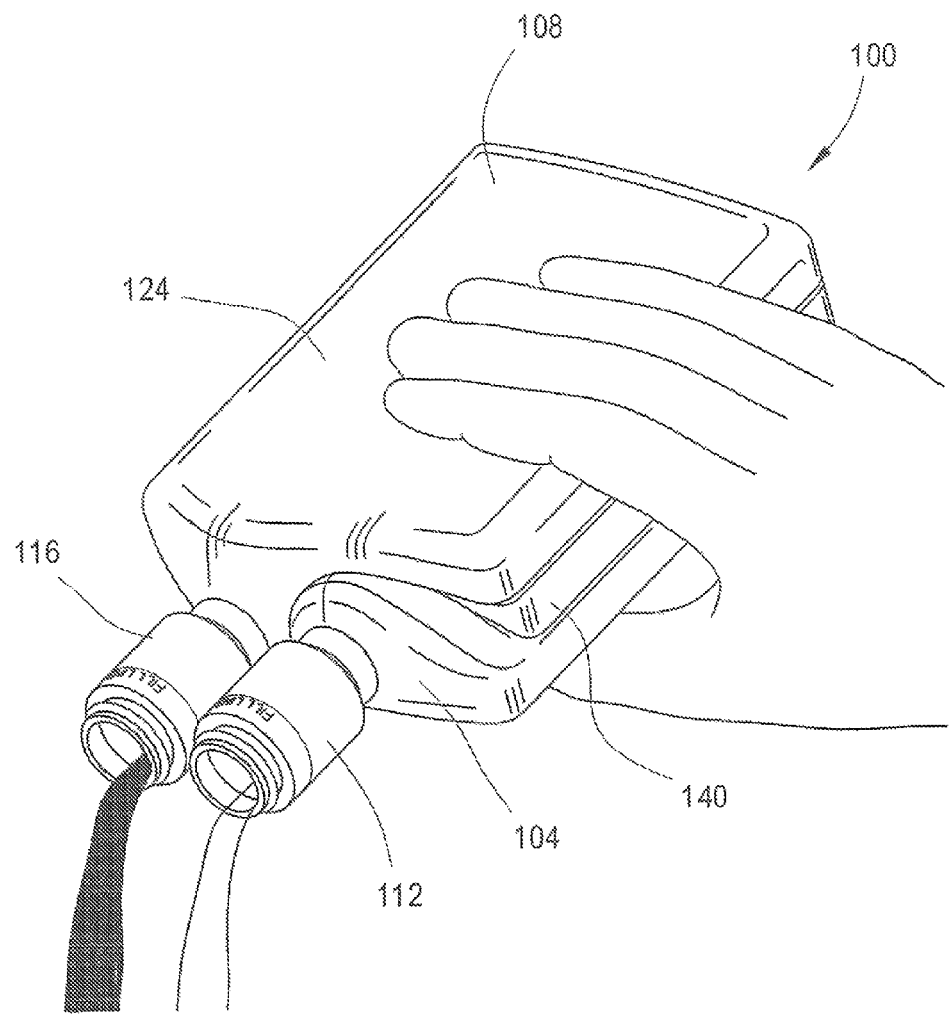
FIG. 1 is a perspective view of an exemplary embodiment of a dual bottle container including two identical bottles with an insert between the bottles, and also illustrating a user pouring two different liquids from the measuring wells of the bottles.
Figure 2:
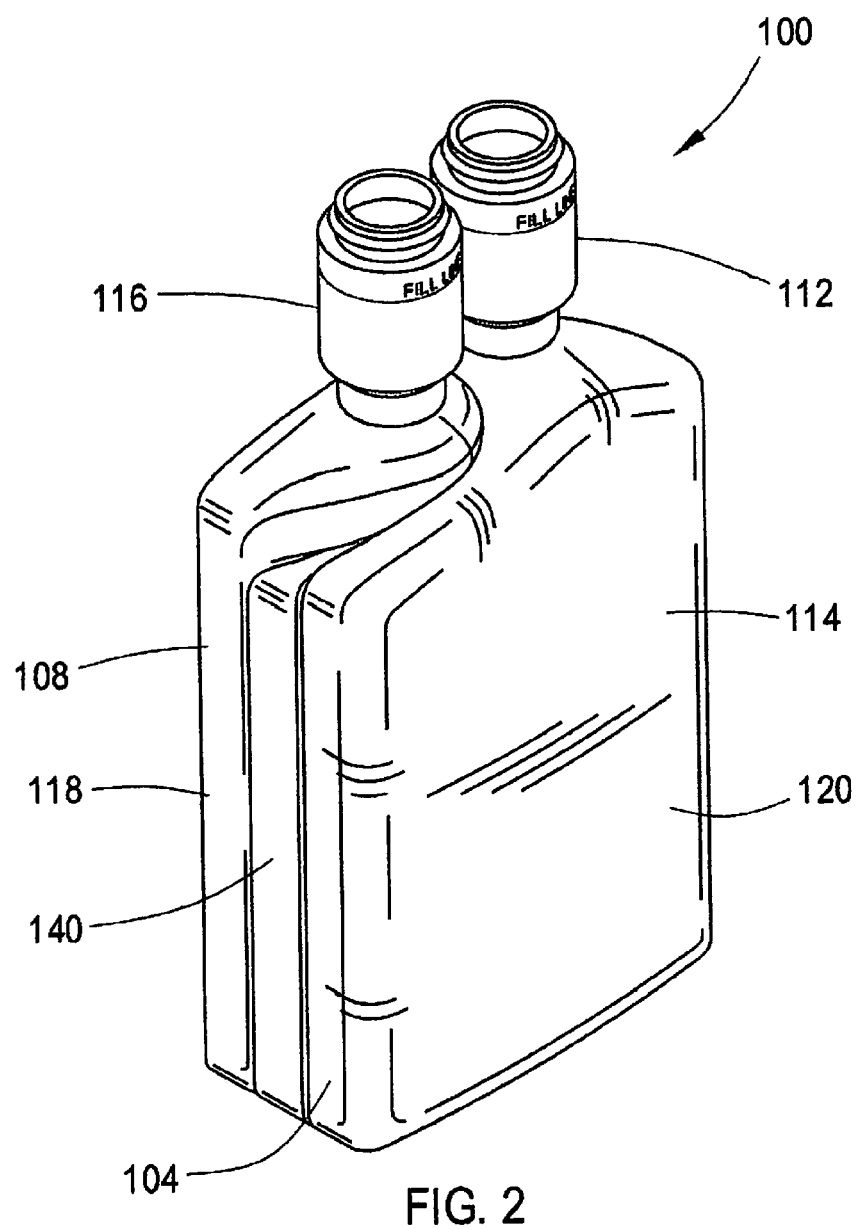
FIG. 2 is another perspective view of the dual bottle container shown in FIG. 1.

FIG. 1 also shows a user pouring liquids from the measuring wells 112, 116. Before pouring the liquids, the user may, for example, squeeze the container 100 when the container 100 is upright (as shown in FIG. 2) by applying pressure between a thumb placed on the container's front wall 120 (which is the outer wall of the first bottle 104) and fingers on the container's back wall 124 (which is the outer wall of the second bottle 108), or vice versa. By squeezing the container 100 in this exemplary manner, liquid may be transferred from the reservoirs of the bottles 104, 108 to the measuring wells 112, 116, such as by the exemplary liquid transfer system shown in FIGS. 8-10, etc. Accordingly, the container 100 has an ergonomic configuration as it allows a user to place a thumb on the front wall and fingers on the rear wall (or vice versa) when using the container 100, such as when holding, squeezing, and/or pouring.

The user may continue to squeeze the container 100 until the measuring wells 112, 116 are filled up to a predetermined level or fill line, which may be labeled with text such as "FILL LINE". For example, "FILL LINE" may be on each bottle twice, diametrically opposite so that the user can read the labels on each bottle from either side. Additionally, or alternatively, measurement markers (e.g., lines indicating teaspoons, ounces, milliliters, other dosages, etc.) may be provided on the measuring wells. In either case, the measuring wells are preferably transparent or translucent to allow the user to see how much liquid is within the measuring wells for comparison to the fill lines or measurement makers.

Depending on the particular application, fill lines may be at the same height or different heights on each measuring well depending on whether the liquids will be dispensed in equal amounts or unequal amounts. In either case, the dual bottle container 100 may be configured such that liquid in excess of the predetermined measured quantities (e.g., above the fill lines) will flow from the measuring wells back into the reservoirs of the bottles. And, the measuring wells 112, 116 may be configured with excess space (e.g., 128 shown in FIG. 6) above the fill lines to allow filling of both measuring wells 112, 116 to their fill lines even if pressure applied to the first and second bottles 104, 108 is unequally causing one measuring well to fill faster than the other measuring well without overflow or spillage of liquid from the measuring well that fills faster.

Figure 3:
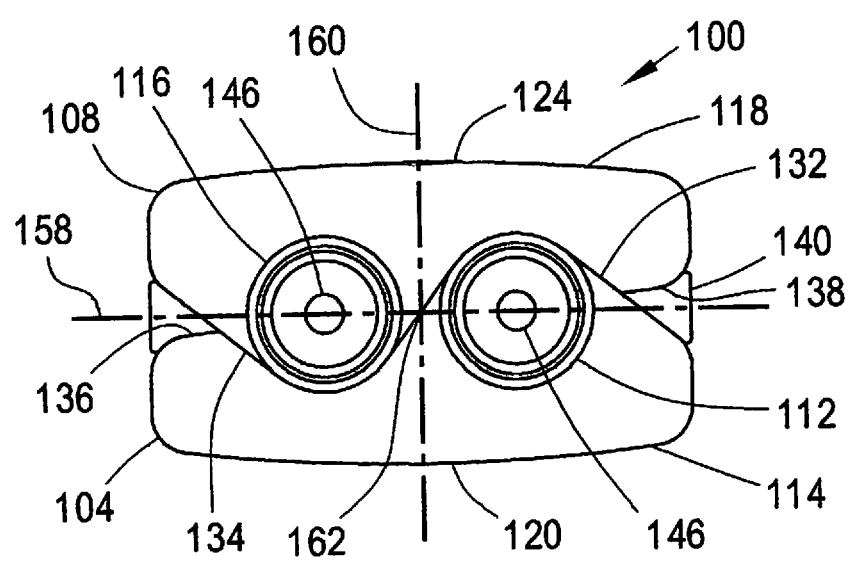
FIG. 3 is a top view of the dual bottle container shown in FIGS. 1 and 2, and further illustrating the side-by-side positioning of the measuring wells centered along the container's longitudinal axis.

As shown in FIG. 3, the first bottle 104 includes a mating configuration or formation 132 configured for engagement with (e.g., configured to accept, etc.) a mating configuration or formation 134 of the second bottle 108. In this example, each bottle 104, 108 includes a protruding portion or projection that protrudes or projects outwardly relative to or from its inner wall 136, 138 in a direction towards the other bottle. The protruding portions may have a sufficient length so as to extend over and across an insert 140 positioned between the inner walls 136, 138 of the first and second bottles 104, 108 as shown in FIGS. 1-3 and further described later. As shown in FIG. 2, the upper portions (e.g., shoulders, etc.) of the bottles 104, 108 are configured to be engaged and come together (e.g., nest, abut, etc.) so as to cooperatively define an upper portion (e.g., shoulders, etc.) of the container 100.

As shown in FIG. 3, each protruding portion includes at least a portion of the opening and at least a portion of the mating surface of one bottle that overlaps the inner wall of the other bottle. For example, at least a portion of the opening and at least a portion of the mating surface of the first bottle 104 extend over or overhang the inner wall 138 of the second bottle 108 when the container 100 is upright. Likewise, at least a portion of the opening and at least a portion of the mating surface of the second bottle 108 extend over or overhang the inner wall 136 of the first bottle 104 when the container 100 is upright. In this example, at least a portion of each of the first and second bottle's measuring wells 112, 116 overlaps (e.g., extends over, overhangs, etc.) the inner wall 138, 136 of the other bottle.

Also in this illustrated embodiment, the first and second bottles 104, 108 are configured such that their openings are side by side at least partially within a vertical plane through an axis 158 (e.g., longitudinal axis, etc.) of the container that extends between opposing sides of the container 100 when upright. The openings of the first and second bottles 104, 108 are at least partially within both a first vertical plane and a second vertical plane. The first vertical plane is defined by (e.g., is coincident with, etc.) the inner wall 136 of the first bottle 104. The second vertical plane is defined by (e.g., is coincident with, etc.) the inner wall 138 of the second bottle 108.

When the upright container 100 is viewed from above as in FIG. 3, at least a portion of the opening of each bottle is outside an outline or perimeter defined by the body of the bottle. Also in this exemplary embodiment when the upright container 100 is viewed from above as in FIG. 3, at least a portion of the first bottle's measuring well 112 is outside an outline or perimeter defined by the body 114 of the first bottle 104, and at least a portion of the second bottle's measuring wells 116 is outside an outline or perimeter defined by the body of the second bottle 108.

When the upright container 100 is viewed from above as in FIG. 3, the protruding portions of the first and second bottles 104, 108 may be configured such that there is a contoured, curved, or non-linear interface between the two bottles, which is generally S-shaped or sinusoidal. The engagement of the bottles' mating surfaces may facilitate alignment and joining of the bottles, such as during manufacture. In addition, other exemplary embodiments may be configured with different configurations than the mating configurations 132, 134 shown in FIG. 3.

FIGS. 8, 9, and 10 illustrate an exemplary liquid transfer system that may be used within either or both bottles 104, 108 for transferring liquid from the bottle's reservoir 143 to its measuring well 112, 116 such as when the dual bottle container 100 is upright (FIG. 2) and squeezed by a user. Although FIGS. 8, 9, and 10 illustrate the liquid transfer system with the first bottle 104, the second bottle 108 may also be provided with an identical liquid transfer system. But this is not required in all embodiments as the second bottle may be provided with a different liquid transfer system than the first bottle in other embodiments.

As shown in FIG. 8, a duct, conduit, or tube 142 (e.g., a dip tube, etc.) extends into the reservoir 143 of the bottle 104. A sealing member 144 (e.g., dip tube fitment, etc.) is disposed within an opening of the bottle 104 between the reservoir 143 and measuring well 112. The sealing member 144 seals the opening and seals the reservoir 143 from the measuring well 112. An extension 146 (e.g., dip tube extension, etc.) extends upwardly from the sealing member 144 into the measuring well 112. The extension 146 has an opening 148 (e.g., nozzle, etc.) for dispensing liquid into the measuring well 112.

In an example embodiment when each bottle 104, 108 is provided with a conduit 142, sealing member 144, and extension 146, the container 100 may be used as follows. First, the user squeezes the container 100 when upright (FIG. 2) to cause liquid from each bottle's reservoir 143 to flow up through its corresponding conduit 142, past the sealing member 144, into the extension 146, and ultimately dispensed from the opening 148 into the corresponding measuring wells 112, 116. The user may continue to squeeze the container 100 until each measuring well 112, 116 fills with liquid up to its FILL LINE—the predetermined measured quantities, volumes, dosages, etc.

Each measuring well 112, 116 may also be configured with excess space 128 above its fill line to allow filling of both measuring wells to their fill lines even if pressure applied to the first and second bottles is unequal causing one measuring well to fill faster than the other measuring well without overflow or spillage of liquid from the measuring well that fills faster. If a measuring well is overfilled, then the user simply waits to allow liquid in excess of the predetermined measured quantity to flow from the overfilled measuring well back through the conduit in communication with the overfilled measuring well such that the liquid is returned to the reservoir of the bottle. As shown in FIGS. 8 and 9, the opening 148 of the extension 146 is aligned with, or at the same height as the FILL LINE, such that the opening 148 will preferably only allow the excess liquid to drain from the measuring well 112 when the container 100 is upright. As such, a visible marking such as a FILL LINE is not required to ensure proper measurement. Rather, the FILL LINE, as shown, simply allows the user to visibly confirm the proper measurement.

After the first and second measuring wells 112, 116 have self-leveled to their respective first and second predetermined quantities, the user may then pour the liquids out of the measuring wells such as shown in FIG. 1. As an example, the user may pour the liquids into a cup for mixing. Accordingly, the container 100 may thus be used in this exemplary manner to dispense the first and second predetermined measured quantities of the first and second liquids, which first and second predetermined measured quantities may be equal or unequal parts of the same liquid or different liquids.

In other exemplary embodiments, a dual bottle container may be configured with a different means for transferring liquid out of the bottles' reservoirs. For example, a dual bottle container may be configured similar to a typical squeeze bottle without any internal tubing.

With further reference to FIGS. 1-3, there is shown the insert 140 between the inner walls 136, 138 of the first and second bottles 104, 108. As shown in FIGS. 2 and 3, the insert 140 is disposed generally underneath the protruding portions and mating formations 132, 134 of the first and second bottles 104, 108. The insert 140 is preferably configured to help retain the first and second bottles 104, 108 together and inhibit relative dispensing of one bottle relative to the other bottle by inhibiting the flexing of the inner walls 136, 138 of the respective first and second bottles 104, 108.

In doing so, the insert 140 can help compensate for differences in pressure applied (e.g., by a user's thumb and fingers) to one bottle relative to the other bottle when the container 100 is squeezed, and help the first and second bottles 104, 108 dispense more equally into their respective measuring wells 112, 116. For example, the force applied by the fingers of a user may be spread out over a larger surface area than the equivalent force applied by the user's thumb causing the two bottles to flex differently. If the inner walls of the two bottles are unsupported relative to each other, then one of the inner walls may flex without the other (or one may flex less than the other) causing the two bottles to dispense unevenly. The insert 140 helps to support the inner walls 136, 138 relative to each other to help achieve more equal dispensing. In another example, variability in manufacturing may result in varying or different wall thicknesses of the two bottles. Again, in this case, inner walls that are unsupported relative to each other may flex in a manner that causes uneven or unequal dispensing due to varying or different wall thicknesses. The insert 140 supports the inner walls 136, 138 and helps prevent inner wall flexing that may cause uneven dispensing.

The insert 140 also fills space between the two bottles 104, 108, which helps simplify the bottle shapes (e.g., eliminates sharp corners, etc.) for example to help facilitate blow molding, etc. The insert 140 further allows the mating of bottles that do not have mating shapes, allows bottle shapes that facilitate molding, and helps to reduce (or preferably minimize) a seam between the two bottles. For example, there may be voids or gaps between the radiused or curved corner portions of the first and second bottles when assembled together without an insert therebetween. In exemplary embodiments, the insert closes off and fills the void or gap that would otherwise exist along the interface between the radiused or curved corner portions. By helping to create a more continuous surface without large gaps along the interface, the insert helps reduce puncturing or tearing, for example, of a heat shrink wrapping at the void or gap, which has been reduced (or preferably eliminated). The insert also helps inhibit movement (e.g., sliding, wiggling, etc.) of one bottle relative to the other.

Figure 11:
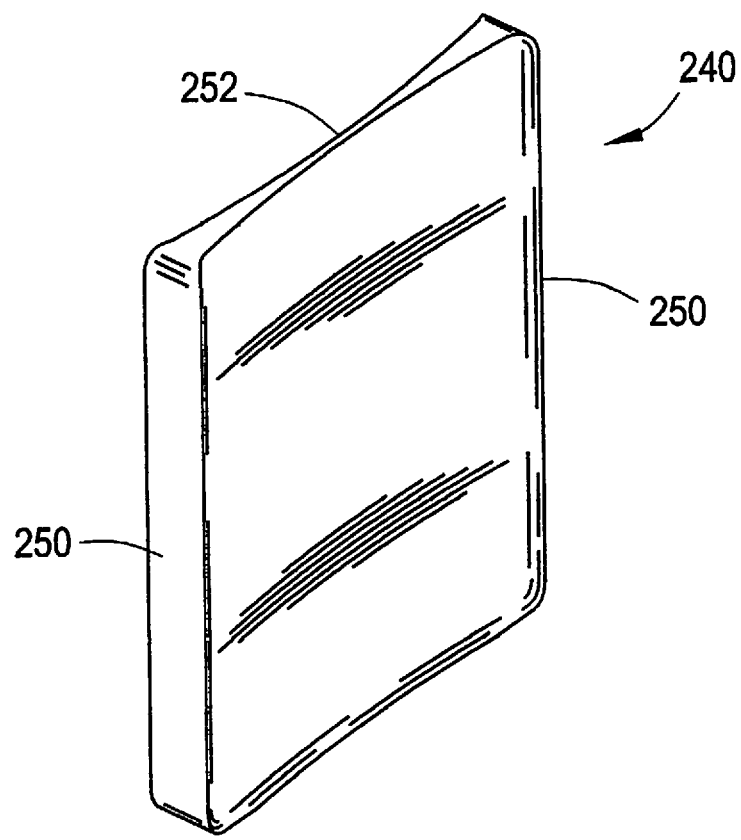
FIG. 11 is a perspective view of an insert that may be positioned between the two bottles shown in FIG. 1 according to an exemplary embodiment.

FIG. 11 illustrates an exemplary embodiment of an insert 240, which may be positioned between the bottles of a dual bottle container, such as dual bottle container 100, etc. As shown in FIG. 11, the insert 240 is thicker along its left and right side edges 250 and reduces or tapers down in thickness towards the middle or center 252 of the insert 240 to generally match the contour of the bottles (e.g., bottles 104, 108, etc.).

Figure 12:
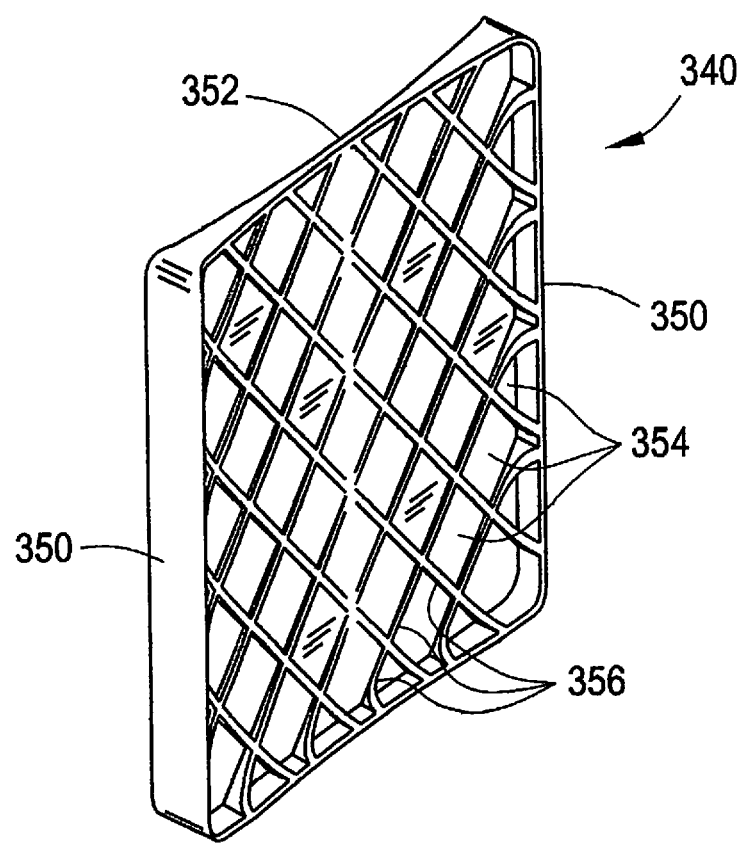
FIG. 12 is a perspective view of an alternative insert that may be positioned between the two bottles shown in FIG. 1 according to another exemplary embodiment.

FIG. 12 illustrates an exemplary embodiment of an insert 340, which may be positioned between the bottles of a dual bottle container, such as dual bottle container 100, etc. As shown in FIG. 12, the insert 340 is also thicker along its left and right side edges 350 and reduces or tapers down in thickness towards the middle or center 352 of the insert 340 to generally match the contour of the bottles (e.g., bottles 104, 108, etc.). In this example, the insert 340 has recesses or openings 354 defined between ribs 356 that taper down and reduce in thickness towards the middle 352 of the insert 340. The recesses or openings 354 may help reduce the amount of material otherwise needed for making an insert, which, in turn, would reduce material costs.

The exemplary configurations shown in FIGS. 11 and 12 for the inserts 240 and 340 preferably allow the insert to help retain two bottles together when the insert 240 or 340 is positioned between those two bottles (e.g., bottles 104, 108, etc.), while also inhibiting dispensing of one bottle without the other by inhibiting flexing of one bottle without the other. For example, the insert 240 or 340 will inhibit flexing of the inner walls 136, 138 of the respective first and second bottles 104, 108 when positioned between the bottles 104, 108. In doing so, the insert can help compensate for differences in pressure applied to one bottle relative to the other bottle when the container (e.g., container 100, etc.) is squeezed, and will also help the two bottles dispense more equally.

Figure 13:
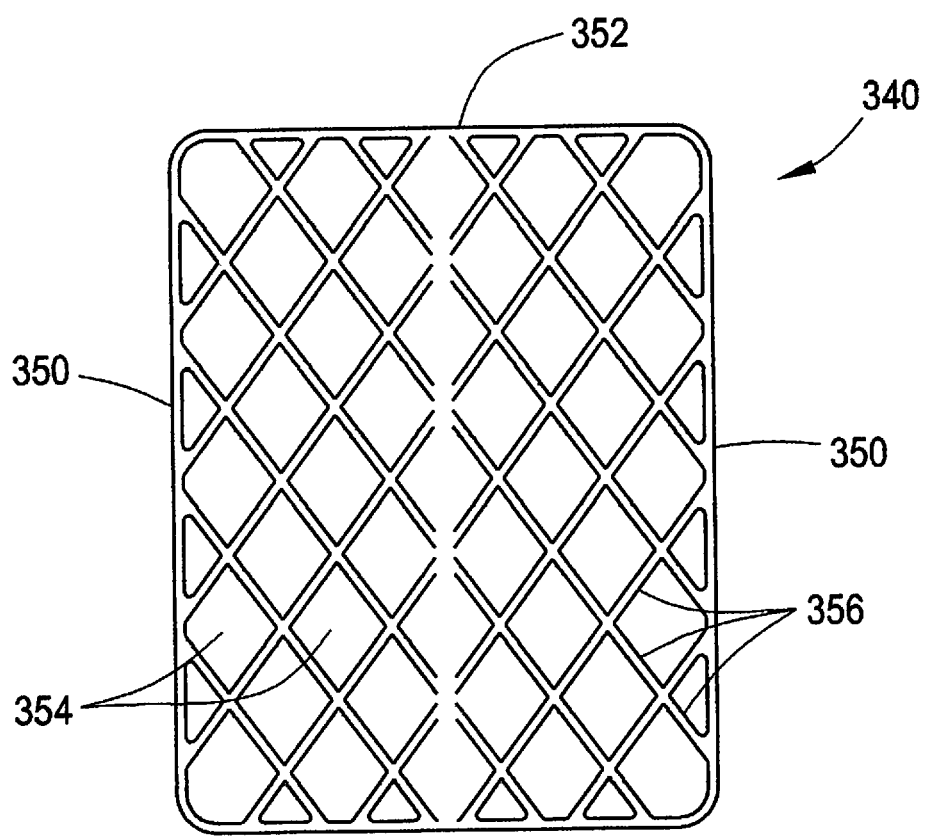
FIG. 13 is a front view of the insert shown in FIG. 12.

A wide variety of materials (e.g., plastics, rubber, paper or wood products, recycled materials, etc.) and manufacturing processes (e.g., injection molding, compression molding, stamping, etc.) may be used for the various inserts (e.g., 140, 240, 340, etc.) disclosed herein. Other exemplary embodiments may include an insert configured differently than what is shown in FIGS. 11-13, such as an insert having thru-holes, perforations, etc. Further exemplary embodiments may include an insert integrally formed with one of the two bottles of a dual bottle container. Still further exemplary embodiments (e.g., dual bottle container 400 (FIG. 14), etc.) do not include an insert.

The bottles 104, 108 and insert 140 may be coupled together in various ways. By way of example, the insert 140 may be positioned between the two bottles 104, 108 and after the bottles are aligned, a heat shrink wrapping (e.g., product label, etc.) may be wrapped about the 104, 108. Then, heat may be applied to shrink the wrapping such that the shrunk wrapping holds the bottles in place. Alternatively embodiments may include other suitable means for holding the bottles together, including adhesives, packaging, glue, tape, etc.

As shown in FIG. 3, the first and second bottles 104, 108 may be further configured such that their measuring wells 112, 116 are side by side and at least partially within a vertical plane through or coincident with the axis 158 (e.g., a longitudinal axis, etc.) of the container that extends between opposing sides of the container 100 when upright. The measuring wells 112, 116 are also offset from an axis 160 (FIG. 3) (e.g., a lateral or transverse centerline axis, etc.) and an axis 162 (FIG. 3A) (e.g., a vertical centerline axis, etc.) which also coincides with the intersection of axes 158 and 160 (FIG. 3). The measuring wells 112, 116 of the first and second bottles 104, 108 are at least partially within both a first vertical plane and a second vertical plane. The first vertical plane is defined by (e.g., is coincident with, etc.) the inner wall 136 of the first bottle 104. The second vertical plane is defined by (e.g., is coincident with, etc.) the inner wall 138 of the second bottle 108.

In this illustrated example shown in FIG. 3, the vertical plane through the axis 158 intersects (e.g., bisects, etc.) the assembled container 100 (e.g., into equal or about equal, identical or substantially identical front and back halves with equal or about equal thicknesses, etc.) such that the vertical plane through the axis 158 may also be referred to herein as an intersecting (e.g., bisecting) plane of the container 100. Likewise, a vertical plane through or coincident with the axis 160 (e.g., a lateral centerline axis, etc.) also intersects the assembled container 100 (e.g., into equal or about equal, identical or substantially identical lateral halves with equal or about equal widths, etc.) such that the vertical plane through the axis 160 may also be referred to herein as an intersecting (e.g., bisecting, etc.) plane of the container 100.

The openings are aligned along at least one (and only one, i.e., axis 158 in the illustrated embodiment) of the axes 158, 160, 162 of the assembled container 100. But the opening of a particular bottle may be offset from and thus not aligned or coincident with any one of the corresponding axes of the body of that bottle. For example, the bottle's measuring well or opening may have a circular cross section around an axis, which axis is offset from and not coincident with any of the three principal mutually orthogonal planes or centrally located axes, or through or coincident with a centerline, center, or midpoint of the bottle's body. By way of further example, each bottle may define a primary longitudinal axis (in a side to side lengthwise direction) that extends substantially linearly between the sides of the bottle and a lateral axis (front to back or inner to outer). The opening may not share a common center axis with the body of the bottle.

Figure 3A:
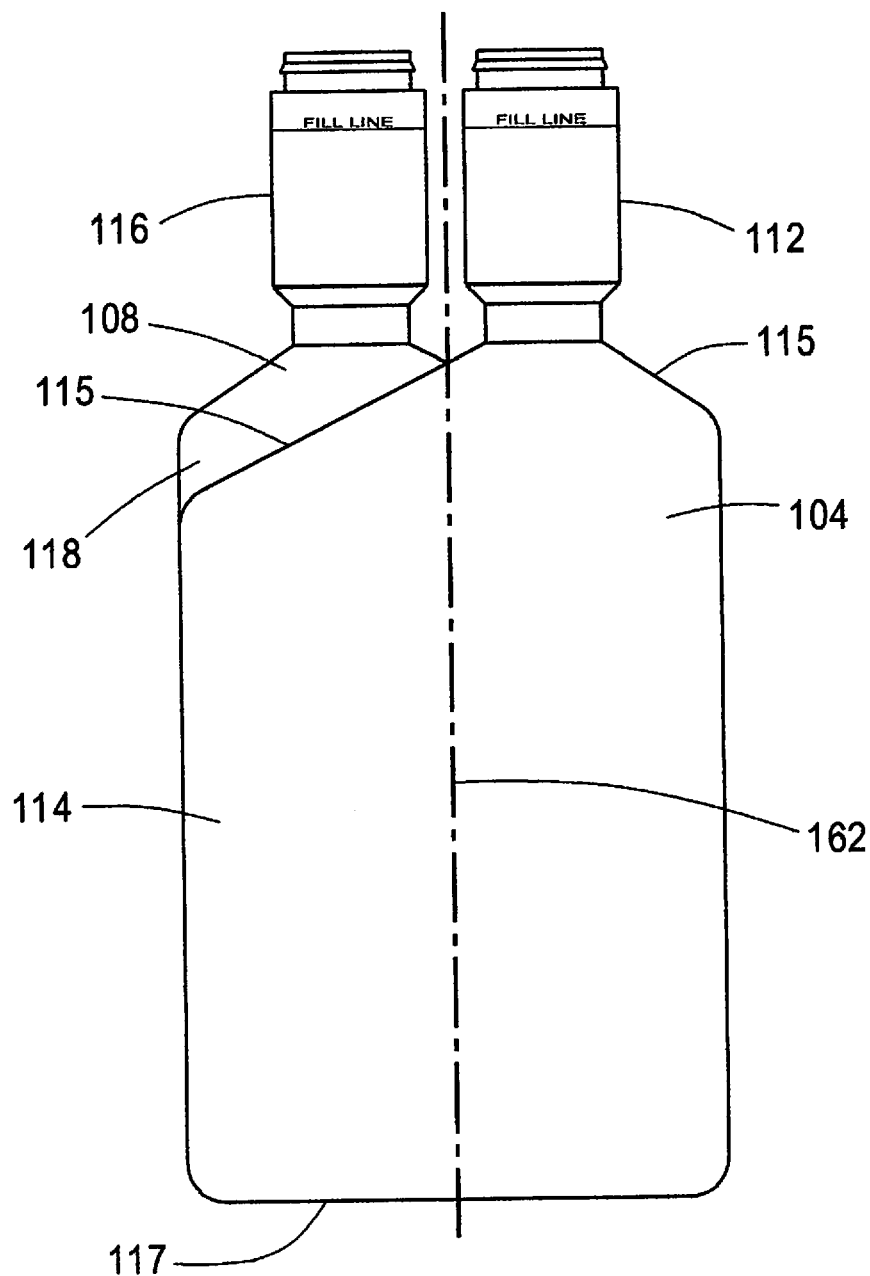
FIG. 3A is a front view of the dual bottle container shown in FIG. 1, and illustrating a vertical axis of the dual bottle container.
Figure 4:
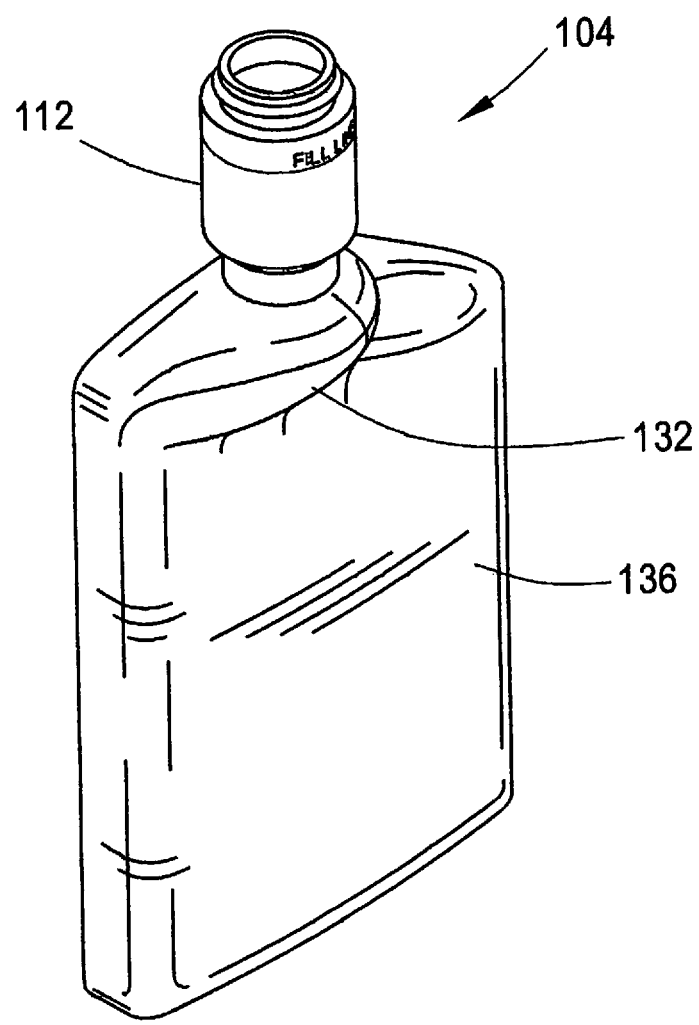
FIG. 4 is a perspective view of one of the two bottles of the dual bottle container shown in FIGS. 1 and 2.

The measuring wells 112, 116 are spaced apart and on opposite sides of the container's axis 162 as shown in FIG. 3A illustrating the container 100 positioned upright. The measuring wells 112, 116 are centered along the axis 158 of the container 100 (as shown in FIG. 3). This may facilitate the filling of the bottles 104, 108, for example, by allowing the bottles 104, 108 to the filled (after the bottles 104, 108 are coupled together) in a process that may include a splash shield between the bottles 104, 108 to prevent cross-contamination while filling. Alternatively, the bottles may be filled separately before they are coupled together to eliminate the possibility of cross-contamination while filling.

Individually, each bottle may have a measuring well offset from the longitudinal, lateral, and vertical, e.g., centerline, axes of the body of that bottle. For example, and as shown in FIGS. 6 and 7 for the first bottle 104, the measuring well 112 is offset from the axis 164 (FIG. 6) of the body 114 and offset from the axes 166 and 168 (FIG. 7) of the body 114.

Figure 14:
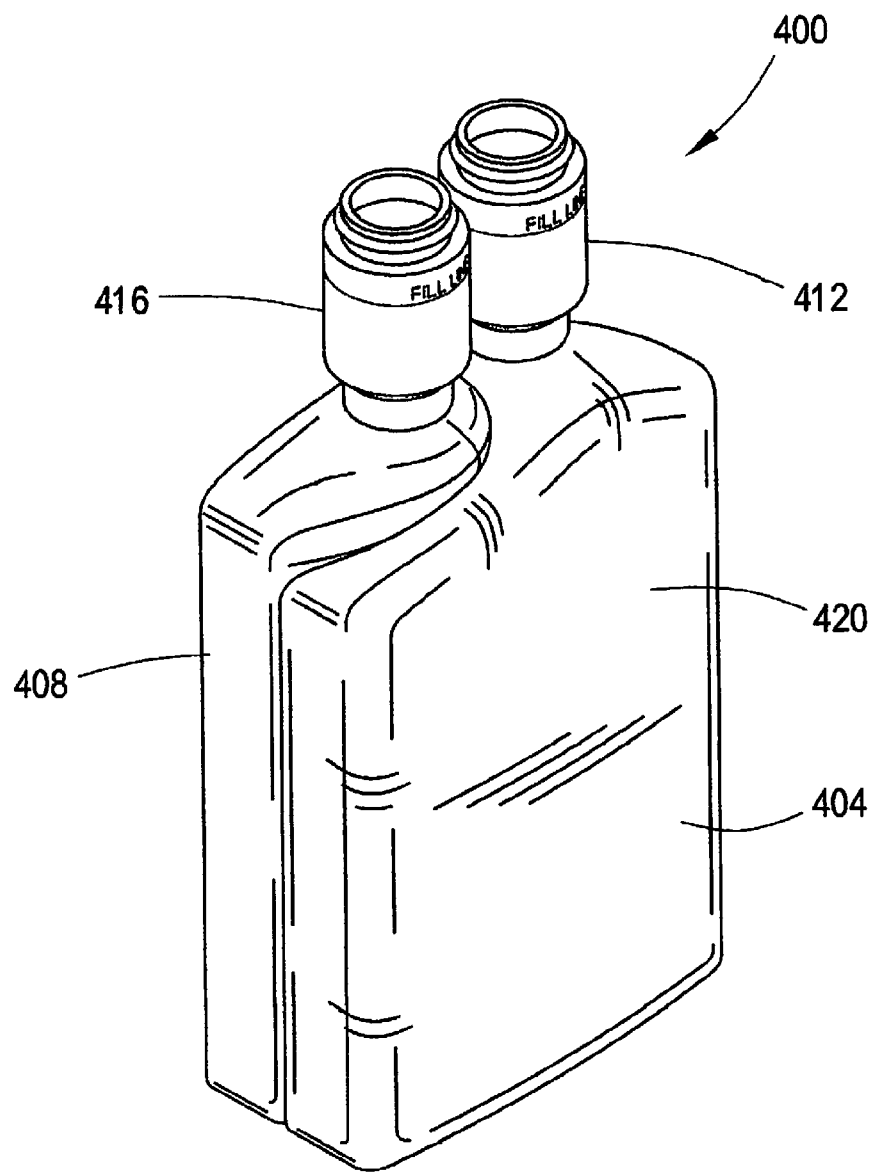
FIG. 14 is a perspective view of another exemplary embodiment of a dual bottle container including two identical bottles coupled together without an insert between the bottles.

FIG. 14 illustrates another exemplary embodiment of a dual bottle container or liquid dispensing apparatus 400 embodying one or more aspects of the present disclosure. As shown, the dual bottle container 400 includes first and second bottles 404, 408. The first bottle 404 includes a first measuring well or dispensing chamber 412. The second bottle 408 includes a second measuring well or dispensing chamber 416.

The first and second bottles 404, 408 are identical in this exemplary embodiment, such that a description of the first and second bottles will be the same. As before, however, other exemplary embodiments may include non-identical bottles, such as two bottles that are similar, substantially the same, or have different configurations.

In addition, the bottles 404, 408 may be generally the same as the bottles 104, 108 discussed above. But in this exemplary embodiment illustrated in FIG. 14, the bottles 404, 408 are coupled together without an insert between the bottles 404, 408. Additionally, the bottles 404, 408 also include reinforcing, mating, and/or alignment features along their inner walls.

Figure 15:
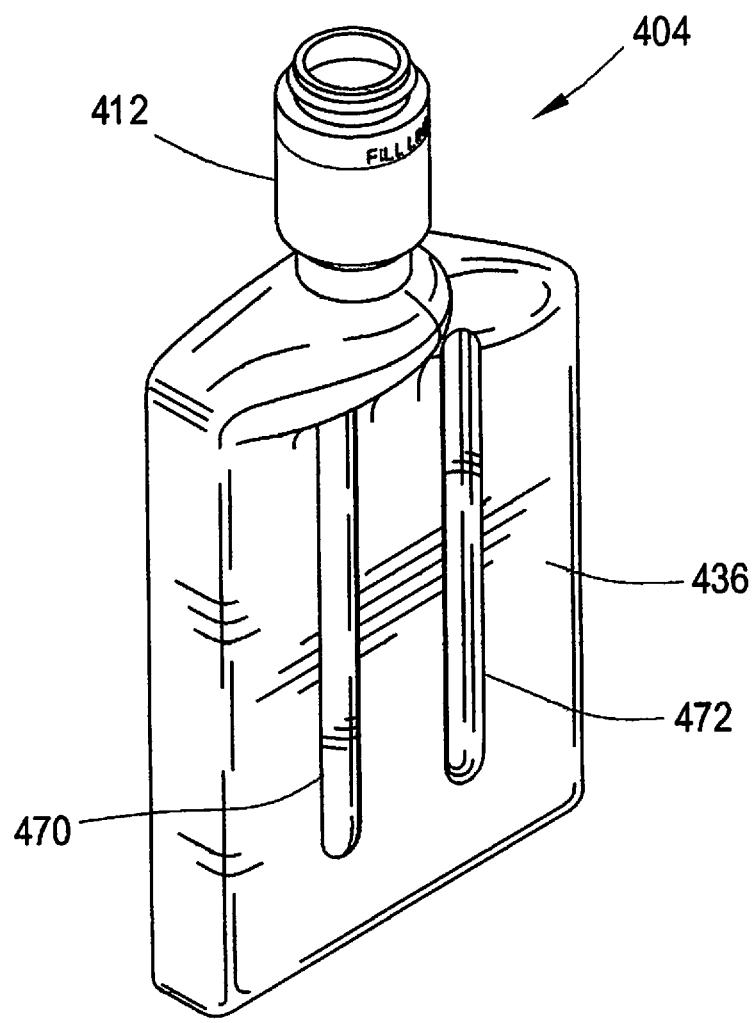
FIG. 15 is a perspective view of one of the two bottles of the dual bottle container shown in FIG. 14, and showing features along an inner wall of the bottle.

For example, FIG. 15 illustrates the first bottle 404 having reinforcing ribs 470 and 472 on its inner wall 436 that may be engaged with corresponding reinforcing ribs along the inner wall of the second bottle 408. By way of example only, the rib 470 is shown as an outwardly extending ridge, and the rib 472 is shown as an inwardly extending groove. Also in this example, the ribs of the second bottle 408 are complementarily shaped ridge and groove for engagement with the groove 472 and ridge 470, respectively, of the first bottle 404. As described, the ribs 470, 472 of the two mating bottles 404, 408 provide inner walls that reinforce each other to help prevent flexing of the inner walls even when uneven or unequal pressure is applied to the bottles by the user as described above. By preventing the inner walls from flexing, the bottles dispense more evenly.

The engagement of the ribs of the first and second bottles 404, 408 may also help with alignment and joining of the bottles, such as during manufacture, and help retain the bottles together. In addition, other exemplary embodiments may include bottles configured differently than the configurations shown in FIGS. 14-18, such as bottles without any ribs, bottles with tongue and groove interlocking features, bottles with detent mechanisms, etc.

The location of the ribs 470 and 472 on the inner wall 436 of the first bottle 404 can be seen in FIGS. 15 thru 18. But the ribs 470 and 472 would not be visible through the outer wall 420 when the bottle 404 is opaque and/or filled with opaque liquid (See FIG. 14). In addition, the top view of the bottle 404 is shown in FIG. 18 without any tube fitment or tube extension installed. As noted above, exemplary embodiments of dual bottle containers may include a liquid transfer system, such as that disclosed above and shown in FIGS. 8-10, etc.

FIGS. 19-24 illustrate another exemplary embodiment of a dual bottle container or liquid dispensing apparatus 500 embodying one or more aspects of the present disclosure. As shown, the dual bottle container 500 includes first and second bottles 504, 508 having an optional insert 540 therebetween. The first bottle 504 includes a first measuring well or dispensing chamber 512. The second bottle 508 includes a second measuring well or dispensing chamber 516.

The first and second bottles 504, 508 are identical in this exemplary embodiment, such that a description of the first and second bottles will be the same. As before, however, other exemplary embodiments may include non-identical bottles, such as two bottles that are similar, substantially the same, or have different configurations.

In addition, the bottles 504, 508 and dual bottle container 500 may be generally the same as the bottles 104, 108 and dual bottle container 100 (or bottles 404, 408 and dual bottle container 400 without the optional insert 540) discussed above. In this exemplary embodiment, the dual bottle container 500 includes a hinged closure or cap 574 for covering and uncovering nozzles, spouts, or openings 576 and 578

Figure 24:
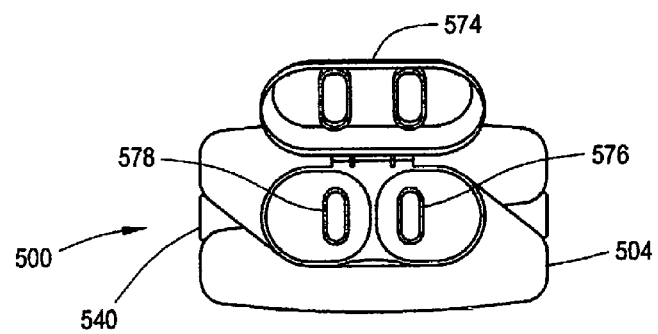
FIG. 24 is another top view of the dual bottle container shown in FIG. 21 after the cap has been opened.
Figure 23:
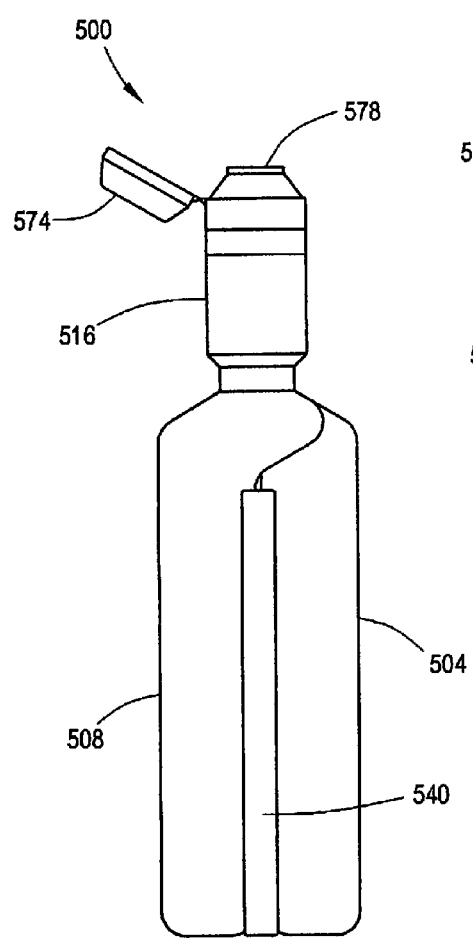
FIG. 23 is another side view of the dual bottle container shown in FIG. 20 after the cap has been opened.
Figure 22:
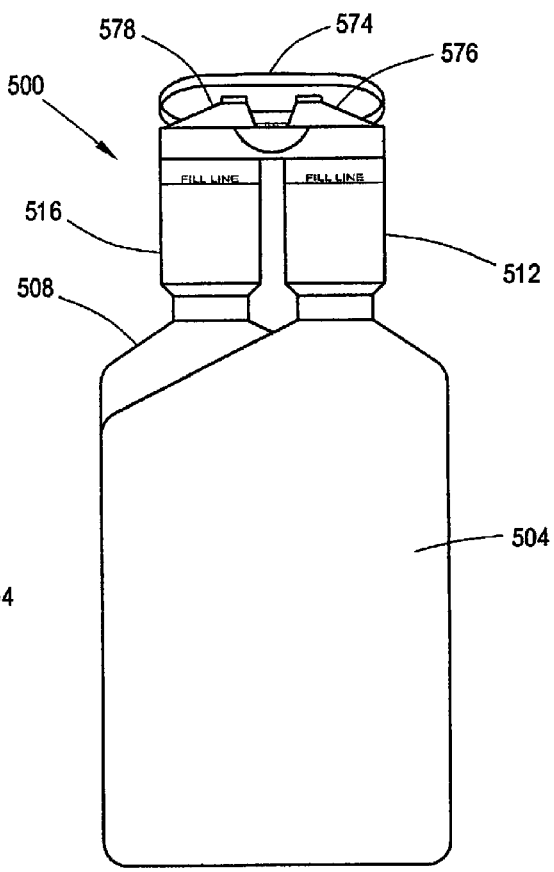
FIG. 22 is another front view of the dual bottle container bottle shown in FIG. 19 after the cap has been opened and further illustrating exemplary spouts for dispensing liquids from the measuring wells.
Figure 27:
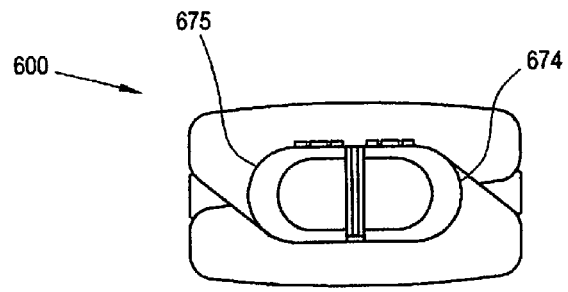
FIG. 27 is a top view of the dual bottle container shown in FIG. 25.
Figure 26:
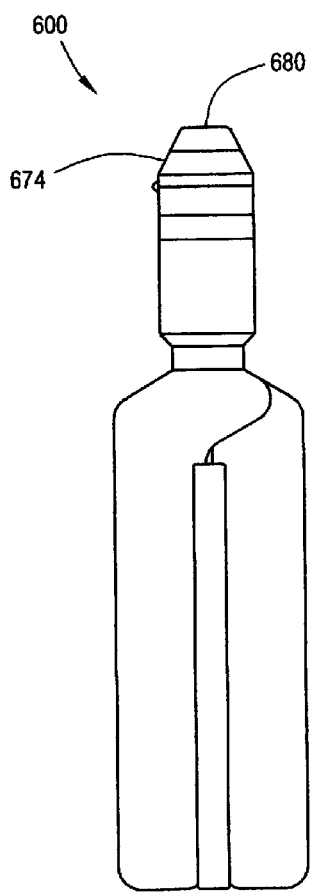
FIG. 26 is a side view of the dual bottle container shown in FIG. 25, and also illustrating the insert between the two bottles
Figure 25:
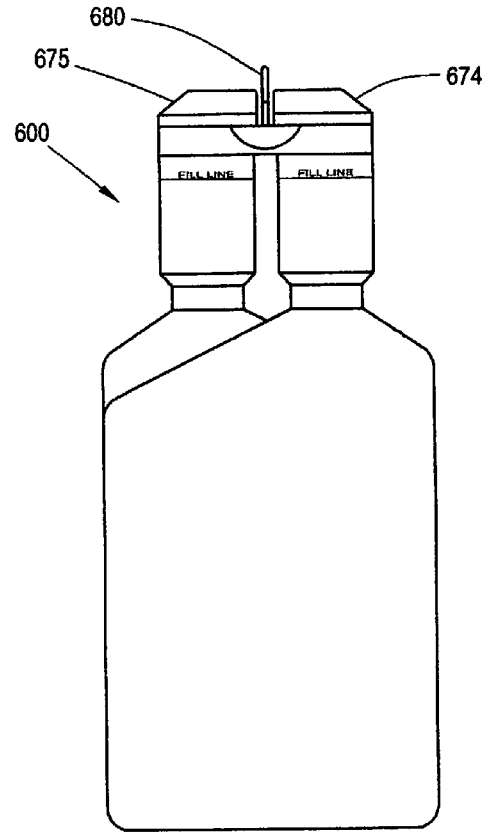
FIG. 25 is a front view of another exemplary embodiment of a dual bottle container also illustrating a pair of hinged closures or caps shown in their closed positions, which caps may be opened or closed independent of each other.

(FIGS. 22 and 23). When the cap 574 is closed as shown in FIGS. 19-21, the cap 574 covers the spouts 576 and 578 and thus helps keep contaminants (e.g., dust, etc.) from getting into the measuring wells 512, 516. When the cap 574 is opened, the spouts 576 and 578 are exposed thus allowing liquids within the measuring wells 512, 516 to be dispensed via the spouts 576, 578. The spouts 576, 578 also help inhibit cross-contamination by raising and reducing the size of the openings into the measuring wells 512, 516. Preferably, the openings of the spouts 576, 578 are oblong to allow air to enter and displace the liquid in the measuring wells 512, 516 as the liquid is poured from the measuring wells 512, 516 through the spouts 576, 578. Alternatively, a separate opening for air and liquid (not shown) could be provided for each measuring well. Optionally, the spouts 576, 578 may be positioned close together as shown in FIGS. 22 and 24 to facilitate pouring into a small opening such as a small cup for mixing. In alternative embodiments without spouts, a hinged closure or cap may be provided for covering and uncovering open tops of the measuring wells.

The hinged closure or cap 574 may be attached to the measuring wells 512, 516 by any adequate method. As shown in FIGS. 22-24 (and other figures later in this description), the closure or cap 574 is a single part attached by a snap fit to both measuring wells 512, 516. Alternatively, however, the measuring wells may be covered by a single cap without attachment by a hinge, lanyard, etc., or two separate caps may be used, one for each measuring well, with or without being attached to its respective measuring well. Caps may be snap fit or utilize any adequate method of attachment, such as screw threads, for example. A hinge, lanyard, etc. is desirable to help ensure that a cap is only used on the measure well to which it is attached thus helping to prevent cross-contamination. Alternatively, caps of different sizes, shapes, colors, configurations, etc. may be used in such a manner to help prevent cross-contamination.

FIGS. 26-30 illustrate another exemplary embodiment of a dual bottle container or liquid dispensing apparatus 600 embodying one or more aspects of the present disclosure. This dual bottle container 600 may be generally the same as the dual bottle container 500 discussed above. In this exemplary embodiment, the dual bottle container 600 includes a pair of hinged closures or caps 674, 675 that may be opened or closed independent of each other. This exemplary embodiment also includes a cross-contamination barrier or divider 680 between the spouts or openings 676 and 678. This optional divider 680 serves to help prevent cross-contamination by providing a barrier to prevent droplets from passing from one spouts or opening to the other, and by prompting the user to pour in the appropriate direction.

FIGS. 31-33 illustrate another exemplary embodiment of a dual bottle container or liquid dispensing apparatus 700 embodying one or more aspects of the present disclosure. This dual bottle container 700 may be generally the same as the dual bottle container 100 discussed above. In this exemplary embodiment, the dual bottle container 700 does not include measuring wells or the liquid transfer system shown in FIGS. 8-10.

Figure 31A:
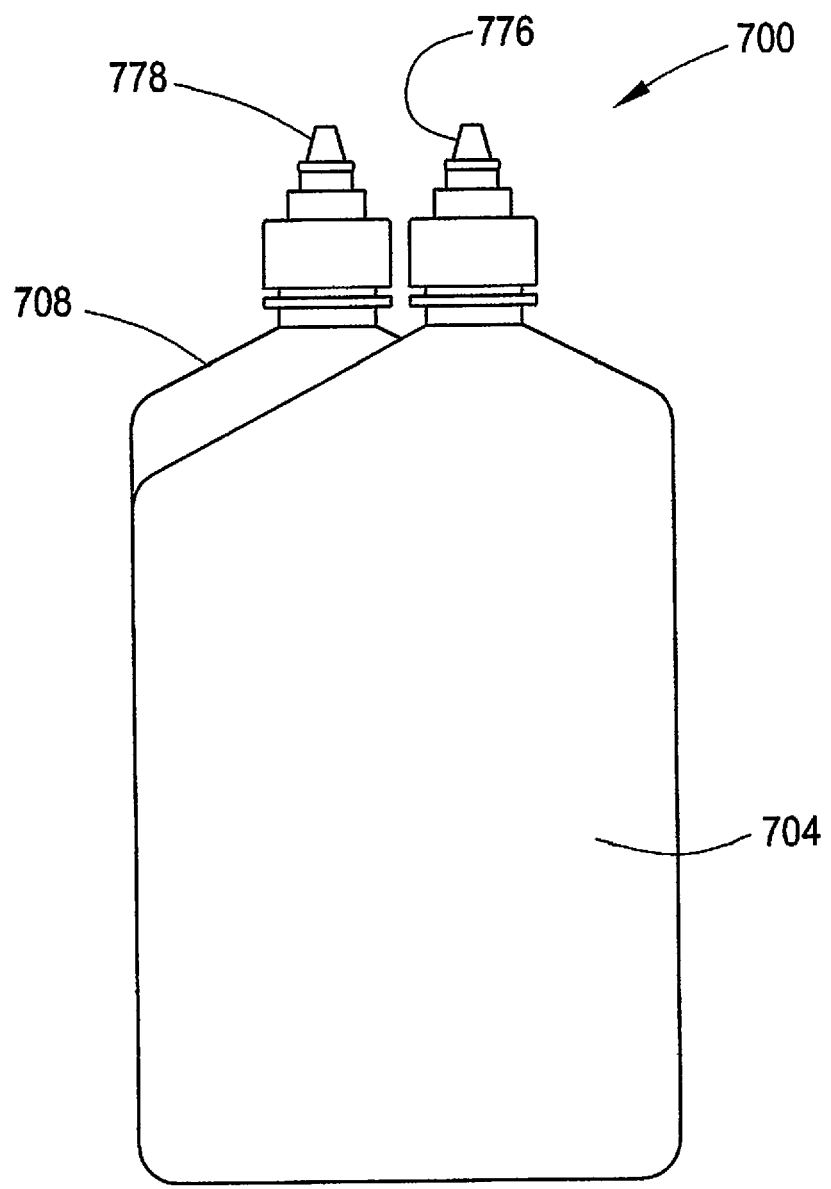
FIG. 31A is another front view of the dual bottle container shown in FIG. 31 with the caps removed and further illustrating exemplary nozzles for dispensing liquids from the bottles.

Instead, the dual bottle container 700 includes nozzles or spouts 776, 778 (shown in FIG. 31A) for dispensing liquid from the bottles 704, 708 when the container 700 is squeezed. In FIGS. 31, 32, and 33, a closure or cap 774, 775 is shown closed over the nozzles 776, 778 which pair of caps 774, 775 may be opened or closed independent of each other. In FIG. 31A, the dual bottle container 700 is shown after the caps 774, 775 have been removed from the nozzles 776, 778. The caps and nozzles in this embodiment may be similar to the conventional caps and nozzles used with commercially available bottled water. Alternative embodiments may include other configurations of nozzles and closures than shown in the figures.

In exemplary embodiments of the inventor's dual bottle containers (e.g., 100, 400, 500, 600, 700, etc.), the measuring wells, necks, spouts, nozzle, openings, etc. may be configured to evenly pour or dispense liquids in parallel streams therefrom. The mixing of the first and second liquids occurs downstream of the measuring wells, such as in a cup, etc. This helps reduce, inhibit, and preferably eliminate contamination between the first and second liquids before and during dispensing as the liquids are poured in parallel, non-mixing streams. This also helps reduce, inhibit, or preferably eliminate cross contamination by preventing the first liquid from flowing back into the second measuring well (and vice versa) when the bottle is titled back upright after use. In alternative embodiments, the dual bottle container may be configured so that the liquids will converge or mix a predetermined downstream distance after being dispensed from the dual bottle container.

FIG. 34 illustrates another exemplary embodiment of a dual bottle container or liquid dispensing apparatus 800 embodying one or more aspects of the present disclosure. This dual bottle container 800 may be generally the same as the dual bottle container 700 discussed above. In this exemplary embodiment, the nozzles or spouts of the dual bottle container 800 are angled inwardly toward each other such that the liquids dispensed from the nozzles will converge or mix. The nozzles angled in such a manner provide the additional feature of focusing the two liquid streams to a common point, or at least closer together, to facilitate dispensing of the two liquids to a small container such as a small mixing cup or an over-cap used in such a manner as described below.

FIG. 34 also illustrates a cup or over-cap 890 positioned over the closures or caps and the nozzles. The over-cap 890 may be removed and used as a measuring and/or mixing vessel for the liquids dispensed from the nozzles into the over-cap 890. The over-cap 890 may also provide a cleaner, safety-sealed package when shrink-wrapped. While an over-cap is shown only in FIG. 34, it should be understood that any of the described embodiments could be configured to include an over-cap.

A wide variety of materials (e.g., plastics, polyethylene, polypropylene polyethylene terephthalate (PET), etc.) and manufacturing processes (e.g., blow molding, extrusion blow molding, injection molding, etc.) may be used for the various components of dual bottle container or liquid dispensing apparatus (e.g., 100, 400, 500, 600, 700, 800, etc.) in exemplary embodiments. For example, disclosed herein are exemplary embodiments of dual bottle containers in which the bottles do not have very sharp corners such that the bottles may be made via blow molding. The particular materials used for the bottles may depend, for example, on the liquids (e.g., light sensitive liquids, acidic liquids, etc.) or other materials that will be stored within and dispensed from the bottles or containers. The bottles may be made from resilient, pliable materials.

If the liquid to be dispensed is light sensitive, it may be desirable to make a bottle with an opaque reservoir in order to prevent light from damaging the liquid contained therein. Since the measuring well is preferably transparent or translucent to allow the user to see the liquid that is being measured, the measuring well would preferably not be opaque. This could be accomplished by using a bottle molded with an integral measuring well and made of a transparent or translucent material as previously described and covering the reservoir portion of the bottle with an opaque covering or coating such as a shrink-wrap, paint, powder coat, etc.

Another alternative would be to mold the reservoir portion of the bottle using an opaque material and the measuring well using a transparent or translucent material. This could be accomplished, for example, by co-injection of the bottle pre-form used in the blow molding process.

Yet another alternative would be to make all or a portion of the measuring well as a separate part that is transparent or translucent and is attached to an opaque bottle.

Still another alternative would be to make a transparent or translucent cap that includes at least a portion of the measuring well. Attached to an opaque bottle, the transparent or translucent cap would allow the user to see into at least the upper portion (including the optional FILL LINE) of the measuring well while the liquid in the reservoir would be shielded from light.

As shown in FIGS. 5-7, the exemplary bottle includes a body which is the main content holding portion. The body defines a reservoir for holding a liquid. In this example, the body has a longitudinal centerline axis, a lateral centerline axis, and a vertical centerline axis. Each bottle also has an opening for dispensing liquid from within the reservoir, which opening is offset from the longitudinal, lateral, and vertical centerline axes of the body. Due to the opening being offset from centerline axes, and depending on the amount and location of this offset, it may be desirable to create a bottle pre-form with varying wall thickness. The wall thickness of the pre-form would be varied in amount and location to compensate for the amount and location of the bottle opening relative to the body axes in order to maintain the desired wall thickness of the finished blow molded bottle. Accordingly, aspects of the present disclosure relate to methods of making bottles for a dual bottle container via blow molding while using a pre-form with varying wall thickness.

In accordance with aspects of the present disclosure, exemplary embodiments are disclosed of multi-bottle containers and apparatus for dispensing liquids. In an exemplary embodiment, a container includes a first bottle and a second bottle coupled to the first bottle. Each bottle includes a reservoir for holding a liquid, an opening for dispensing liquid from within the reservoir, and an inner wall facing in a direction towards the other bottle. Each bottle also includes a mating surface configured to accept a mating surface of the other bottle, and with at least a portion of the mating surface overlapping the inner wall of the other bottle. The first and second bottles are configured such that their openings are side by side with at least a portion of the opening of the first bottle overlapping the inner wall of the second bottle and with at least a portion of the opening of the second bottle overlapping the inner wall of the first bottle.

Another exemplary embodiment includes an apparatus for dispensing measured quantities of liquids. In this exemplary embodiment, the apparatus includes a first container and a second container. Each container includes a body defining a reservoir for holding a liquid and an opening for dispensing liquid from within the reservoir. The opening includes at least a portion outside an outline defined by the body as viewed from above when the container is upright. The first and second containers are configured such that their openings are side by side when the first and second containers are coupled.

In another exemplary embodiment, a container includes a first bottle and a second bottle coupled to the first bottle. The first bottle has a first reservoir for holding a first liquid and a first opening for dispensing the first liquid from within the first reservoir. The second bottle has a second reservoir for holding a second liquid and a second opening for dispensing the second liquid from within the second reservoir. An insert is between the first and second bottles. The insert is configured to help retain the first and second bottles together and inhibit flexing of one bottle without the other bottle to thereby help compensate for differences in pressure applied by to one bottle relative to the other bottle when the container is squeezed and help the first and second bottles dispense more equally.

In another exemplary embodiment, a container includes a first bottle and a second bottle coupled to the first bottle. Each bottle includes a body defining a reservoir for holding a liquid, an opening for dispensing liquid from within the reservoir, and a mating surface configured to accept a mating surface of the other bottle. The first and second bottles are configured such that their openings are side by side at least partially within a vertical plane through an axis of the container that extends between opposing sides of the container when upright, which vertical plane passes through at least a portion of the mating surfaces of the first and second bottles.

In another exemplary embodiment, a container includes a first bottle and a second bottle coupled to the first bottle. The first bottle includes a first reservoir for holding a first liquid and a first opening for dispensing the first liquid from within the first reservoir. The second bottle includes a second reservoir for holding a second liquid and a second opening for dispensing the second liquid from within the second reservoir. Each bottle includes an inner wall facing in a direction towards the other bottle. The inner walls of the first and second bottles are reinforced by ribs that are configured to inhibit flexing of one bottle without the other bottle to thereby help compensate for differences in pressure applied to one bottle relative to the other bottle when the container is squeezed and help the first and second bottles dispense more equally.

In various exemplary embodiments disclosed herein, the bottles may have identical configurations. Each bottle may include a dispensing chamber in communication with the opening. A conduit, duct, or tube (e.g., dip tube, etc.) may extend into the reservoir and be in communication with the dispensing chamber. The bottles may be configured (e.g., with wall thickness, made from a flexible material, etc.) to flex upon application of a compression force such that liquid from the reservoirs flows up through the corresponding conduits and into the corresponding dispensing chambers. The first bottle may be configured to dispense a first predetermined measured quantity of a first liquid, such that liquid in excess of the first predetermined measured quantity flows from the dispensing chamber back through the conduit into the reservoir of the first bottle. The second bottle may be configured to dispense a second predetermined measured quantity of a second liquid, such that liquid in excess of the second predetermined measured quantity flows from the dispensing chamber back through the conduit into the reservoir of the second bottle. Accordingly, the container may thus be usable or operable for dispensing the first and second predetermined measured quantities of the respective first and second liquids, which first and second predetermined measured quantities may be equal or unequal parts of the same liquid or different liquids.

Each bottle may include a measuring well, such that application of a compression force to the first and second bottles causes liquid from the reservoirs to flow up through the corresponding conduits and into the corresponding measuring wells of the first and second bottles. Each measuring well may be configured with excess space above a fill line to allow filling of both said measuring wells to their fill lines even if pressure applied to the first and second bottles is unequal causing one measuring well to fill faster than the other measuring well without overflow or spillage of liquid from the measuring well that fills faster.

The container may include a front wall, a back wall, and an ergonomic configuration that allows a user of the container when dispensing to place a thumb on the front wall and fingers on the back wall or a thumb on the wall and fingers on the front wall. The entire front wall of the container may be defined solely by a wall of one of the first and second bottles. The entire back wall of the container may be defined solely by the other one of the first and second bottles. The first and second bottles may cooperatively define top and bottom portions, surfaces, or walls of the container.

The first bottle may include an outer wall facing in a direction away from the second bottle and an inner wall facing in a direction towards the second bottle. The second bottle may include an outer wall facing in a direction away from the first bottle and an inner wall facing in a direction towards the first bottle. The outer walls of the first and second bottles may be configured to allow a user of the container when dispensing to place a thumb on the outer wall of one of the first and second bottles and to place fingers on the outer wall of the other one of the first and second bottles.

An insert may be disposed between the first and second bottles. The insert may be configured to help retain the first and second bottles together and inhibit flexing of one bottle without the other bottle. In doing so, the insert can help compensate for differences in pressure applied to one bottle relative to the other bottle when the container is squeezed and help the first and second bottles dispense more equally. Additionally, or alternatively, the insert may be configured to allow mating of bottles without mating shapes and/or to allow bottle shapes that facilitate molding. The insert may also or alternatively be configured to reduce a seam between the bottles that would otherwise exist without the insert by filling gaps or voids between the bottles (e.g., between the radiused or curved corner portions of the containers, etc.).

Each bottle may include a protruding portion that protrudes in a direction toward the other bottle. The protruding portion may include at least a portion of the opening and at least a portion of a mating surface configured to accept a mating surface of the other bottle. The at least a portion of the opening and at least a portion of the mating surface may overlap the inner wall of the other bottle.

The first and second bottles may be configured such that their openings are aligned side by side along axis (e.g., a longitudinal centerline axis, etc.) of the container, which may facilitate the filling of the bottles, e.g., allow the bottles to the filled simultaneously with a splash shield therebetween after the bottles are coupled together, etc. Accordingly, aspects of the present disclosure also relate to methods of simultaneously filling bottles of an assembled dual bottle container, though alternative embodiments may include filling the bottles separately and then assembling the bottles together to form the assembled dual bottle container.

The container may be configured to dispense measured amounts of first and second liquids from the reservoirs of the respective first and second bottles. The first and second bottles may be moldable (e.g., blow moldable, etc.). The first and second bottles may be configured such that their openings are spaced apart from each other along a longitudinal centerline axis of the container.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.) and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. Aspects of the present disclosure are not limited to any particular use or any particular types of liquids, as exemplary embodiments disclosed herein may be used with a wide range of fluids, liquids, solutions, suspensions, emulsions, gases, other flowable compositions or products, combinations thereof, etc. Depending on the particular application, an exemplary embodiment may include two bottles filled with the same liquid or same type of physical substance, while another exemplary embodiment may include two bottles filled with different liquids or different types of substances.

The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A container comprising a first bottle and a second bottle coupled to the first bottle, each said first and second bottle comprising:
    a reservoir for holding a liquid;
    an opening for dispensing liquid from within the reservoir;
    an inner wall facing in a direction towards the other bottle; and
    a mating surface configured to accept a mating surface of the other bottle, and with at least a portion of the mating surface overlapping the inner wall of the other bottle;
    wherein the first and second bottles are configured such that when upright their openings are side by side with at least a portion of the opening of the first bottle extending over the inner wall of the second bottle and with at least a portion of the opening of the second bottle extending over the inner wall of the first bottle; and
    wherein each said first and second bottle includes a measuring well, the first and second bottles are configured such that when upright at least a portion of the measuring well of one bottle extends over the inner wall of the other bottle.

2. The container of claim 1, wherein each said first and second bottle includes a protruding portion that protrudes in a direction toward the other bottle, the protruding portion including:
    the at least a portion of the opening that extends over the inner wall of the other bottle; and
    the at least a portion of the mating surface that extends over the inner wall of the other bottle.

3. The container of claim 1, wherein the first and second bottles are configured such that when upright their openings are side by side at least partially within a vertical plane through an axis of the container that extends between opposing sides of the container.

4. The container of claim 1, wherein the first and second bottles are configured such that when upright their openings are side by side at least partially within a vertical plane through a longitudinal axis of the container.

5. The container of claim 1, wherein the openings of the first and second bottles are at least partially within both a first vertical plane coincident with the inner wall of the first bottle and a second vertical plane coincident with the inner wall of the second bottle.

6. The container of claim 1, wherein:
    each said first and second bottle includes a body defining the reservoir; and
    each said first and second bottle is configured such that at least a portion of the opening is outside a perimeter of the body defining the reservoir as viewed from above when the bottle is upright.

7. A container comprising a first bottle and a second bottle coupled to the first bottle, each said first and second bottle comprising:
    a reservoir for holding a liquid;
    an opening for dispensing liquid from within the reservoir;
    an inner wall facing in a direction towards the other bottle; and
    a mating surface configured to accept a mating surface of the other bottle, and with at least a portion of the mating surface overlapping the inner wall of the other bottle;
    wherein the first and second bottles are configured such that when upright their openings are side by side with at least a portion of the opening of the first bottle extending over the inner wall of the second bottle and with at least a portion of the opening of the second bottle extending over the inner wall of the first bottle;
    wherein each said first and second bottle further comprises:
    a dispensing chamber in communication with the opening;
    a conduit extending into the reservoir and in communication with the dispensing chamber;
    whereby the first and second bottles are configured to flex upon application of a compression force such that liquid from the reservoirs flows up through the corresponding conduits and into the corresponding dispensing chambers.

8. The container of claim 7, wherein each said first and second bottle includes a measuring well, the first and second bottles are configured such that when upright at least a portion of the measuring well of one bottle extends over the inner wall of the other bottle.

9. The container of claim 7, wherein:
the first bottle is configured to dispense a first predetermined measured quantity of a first liquid, such that liquid in excess of the first predetermined measured quantity flows from the dispensing chamber back through the conduit into the reservoir of the first bottle; and
the second bottle is configured to dispense a second predetermined measured quantity of a second liquid, such that liquid in excess of the second predetermined measured quantity flows from the dispensing chamber back through the conduit into the reservoir of the second bottle; and
whereby the container is operable for dispensing the first and second predetermined measured quantities of the respective first and second liquids, which first and second predetermined measured quantities may be equal or unequal parts of the same liquid or different liquids.

10. A container comprising a first bottle and a second bottle coupled to the first bottle, each said first and second bottle comprising:
a reservoir for holding a liquid;
an opening for dispensing liquid from within the reservoir;
an inner wall facing in a direction towards the other bottle; and
a mating surface configured to accept a mating surface of the other bottle, and with at least a portion of the mating surface overlapping the inner wall of the other bottle;
wherein the first and second bottles are configured such that when upright their openings are side by side with at least a portion of the opening of the first bottle extending over the inner wall of the second bottle and with at least a portion of the opening of the second bottle extending over the inner wall of the first bottle;
wherein:
each said first and second bottle further comprises a conduit and a measuring well, whereby the first and second bottles are configured such that application of a compression force to the first and second bottles causes liquid from the reservoirs to flow up through the corresponding conduits and into the corresponding measuring wells of the first and second bottles; and
each said measuring well is configured with excess space above a predetermined level to allow filling of both said measuring wells to their predetermined levels even if pressure applied to the first and second bottles is unequal causing one measuring well to fill faster than the other measuring well without overflow or spillage of liquid from the measuring well that fills faster.

11. The container of claim 1, wherein the mating surface is the inner wall.

12. The container of claim 1, wherein:
the first bottle includes an outer wall facing in a direction away from the second bottle;
the second bottle includes an outer wall facing in a direction away from the first bottle; and
the outer walls of the first and second bottles are configured to allow a user of the container when dispensing to place a thumb on the outer wall of one of the first and second bottles and to place fingers on the outer wall of the other one of the first and second bottles.

13. A container comprising a first bottle and a second bottle coupled to the first bottle, each said first and second bottle comprising:
a reservoir for holding a liquid;
an opening for dispensing liquid from within the reservoir;
an inner wall facing in a direction towards the other bottle;
a mating surface configured to accept a mating surface of the other bottle, and with at least a portion of the mating surface overlapping the inner wall of the other bottle; and
an insert between the first and second bottles, the insert configured to inhibit flexing of one bottle without the other bottle to thereby help compensate for differences in pressure applied to one bottle relative to the other bottle when the container is squeezed and help the first and second bottles dispense more equally;
wherein the first and second bottles are configured such that their openings are side by side with at least a portion of the opening of the first bottle overlapping the inner wall of the second bottle and with at least a portion of the opening of the second bottle overlapping the inner wall of the first bottle.

14. A container comprising a first bottle and a second bottle coupled to the first bottle, each said first and second bottle comprising:
a reservoir for holding a liquid;
an opening for dispensing liquid from within the reservoir;
an inner wall facing in a direction towards the other bottle;
a mating surface configured to accept a mating surface of the other bottle, and with at least a portion of the mating surface overlapping the inner wall of the other bottle; and
an insert between the first and second bottles, the insert is configured to allow mating of the first and second bottles without mating shapes, to allow bottle shapes that facilitate molding, and/or to fill a void along an interface defined between inner walls of the first and second bottles;
wherein the first and second bottles are configured such that their openings are side by side with at least a portion of the opening of the first bottle overlapping the inner wall of the second bottle and with at least a portion of the opening of the second bottle overlapping the inner wall of the first bottle.

15. The container of claim 1, wherein:
the container is configured to dispense measured amounts of first and second liquids from the reservoirs of the respective first and second bottles; and/or
the first and second bottles are moldable; and/or
the first and second bottles are configured such that their openings are spaced apart from each other along a longitudinal axis of the container; and/or
the first and second bottles are configured such that their openings are centered on a longitudinal axis of the container; and/or
the container includes a front wall, a back wall, and an ergonomic configuration that allows a user of the container when dispensing to place a thumb on the front wall and fingers on the back wall or a thumb on the back wall and fingers on the front wall.

16. An apparatus for dispensing measured quantities of liquids, comprising a first container and a second container coupled to the first container, each said first and second container comprising:
a body defining a reservoir for holding a liquid;
an opening for dispensing liquid from within the reservoir, the opening including at least a portion outside a perimeter of the body defining the reservoir as viewed from above when the container is upright;

wherein the first and second containers are configured such that their openings are side by side when the first and second containers are coupled;
wherein each said first and second container comprises a measuring well in communication with the reservoir for receiving liquid from the reservoir; and
wherein the first and second containers are configured such that the measuring wells are side by side when the first and second containers are coupled.

17. The apparatus of claim 16, wherein each said first and second container includes:
an inner wall facing in a direction towards the other container; and
a protruding portion that protrudes in a direction toward the other container, the protruding portion including at least a portion of the opening which extends over the inner wall of the other container when the first and second containers are upright.

18. The apparatus of claim 17, wherein each said first and second container includes a mating surface configured to accept a mating surface of the other bottle, at least a portion of the mating surface defined by the protruding portion and overlapping the inner wall of the other container.

19. The apparatus of claim 16, wherein the openings of the first and second containers are at least partially within both a first vertical plane coincident with the inner wall of the first container and a second vertical plane coincident with the inner wall of the second container.

20. The apparatus of claim 16, wherein the first and second containers are configured such that when upright their openings are side by side at least partially within a vertical plane through an axis of the apparatus that extends between opposing sides of the apparatus.

21. The apparatus of claim 16, wherein the first and second containers are configured such that their openings are side by side at least partially within a vertical plane through a longitudinal axis of the apparatus when upright.

22. An apparatus for dispensing measured quantities of liquids, comprising a first container and a second container coupled to the first container, each said first and second container comprising:
a body defining a reservoir for holding a liquid;
an opening for dispensing liquid from within the reservoir, the opening including at least a portion outside a perimeter of the body defining the reservoir as viewed from above when the container is upright;
wherein the first and second containers are configured such that their openings are side by side when the first and second containers are coupled; and
wherein each said first and second container includes a measuring well, the first and second containers are configured such that when upright at least a portion of the measuring well of one container extends over the inner wall of the other container.

23. An apparatus for dispensing measured quantities of liquids, comprising a first container and a second container coupled to the first container, each said first and second container comprising:
a body defining a reservoir for holding a liquid;
an opening for dispensing liquid from within the reservoir, the opening including at least a portion outside a perimeter of the body defining the reservoir as viewed from above when the container is upright;
wherein the first and second containers are configured such that their openings are side by side when the first and second containers are coupled; and
wherein each said first and second container further comprises a measuring well and a conduit in communication with the measuring well and the reservoir, whereby the first and second containers are configured to flex upon application of a compression force such that liquid from the reservoirs flows up through the corresponding conduits and into the corresponding measuring wells.

24. The apparatus of claim 23, wherein:
the conduit and measuring well of the first container are configured to dispense a first predetermined measured quantity of a first liquid, such that liquid in excess of the first predetermined measured quantity flows from the measuring well back through the conduit into the reservoir of the first container; and
the conduit and measuring well of the second container are configured to dispense a second predetermined measured quantity of a second liquid, such that liquid in excess of the second predetermined measured quantity flows from the measuring well back through the conduit into the reservoir of the second container.

25. The apparatus of claim 24, wherein each said measuring well is configured with excess space above a predetermined level to allow filling of both said measuring wells to their predetermined levels even if pressure applied to the first and second containers is unequal causing one measuring well to fill faster than the other measuring well without overflow or spillage of liquid from the measuring well that fills faster.

26. The apparatus of claim 16, wherein:
the first container includes:
an outer wall facing in a direction away from the second container; and
an inner wall facing in a direction towards the second container;
the second container includes:
an outer wall facing in a direction away from the first container; and
an inner wall facing in a direction towards the first container;
the outer walls of the first and second containers are configured to allow a user of the apparatus when dispensing to place a thumb on the outer wall of one of the first and second containers and to place fingers on the outer wall of the other one of the first and second containers.

27. An apparatus for dispensing measured quantities of liquids, comprising a first container and a second container coupled to the first container, each said first and second container comprising:
a body defining a reservoir for holding a liquid;
an opening for dispensing liquid from within the reservoir, the opening including at least a portion outside a perimeter of the body defining the reservoir as viewed from above when the container is upright; and
an insert between the first and second containers, the insert configured to inhibit flexing of one container without the other container to thereby help compensate for differences in pressure applied to one container relative to the other container when the apparatus is squeezed and help the first and second containers dispense more equally;
wherein the first and second containers are configured such that their openings are side by side when the first and second containers are coupled.

28. The apparatus of claim 27, wherein:
each said first and second container comprises a measuring well in communication with the reservoir for receiving liquid from the reservoir; and the first and second containers are configured such that the measuring wells are side by side when the first and second containers are coupled.

29. The apparatus of claim 16, wherein:
the apparatus is configured to dispense measured amounts of first and second liquids from the reservoirs of the respective first and second containers; and/or
the first and second containers are moldable; and/or
the first and second containers are configured such that their measuring wells are spaced apart from each other along a longitudinal axis of the container; and/or
the first and second containers are configured such that their openings are centered on a longitudinal axis of the container; and/or
the apparatus includes a front wall, a back wall, and an ergonomic configuration that allows a user of the apparatus when dispensing to place a thumb on the front wall and fingers on the back wall or a thumb on the back wall and fingers on the front wall.

30. A container comprising:
a first bottle having a first reservoir for holding a first liquid and a first opening for dispensing the first liquid from within the first reservoir;
a second bottle coupled to the first bottle, the second bottle having a second reservoir for holding a second liquid and a second opening for dispensing the second liquid from within the second reservoir; and
an insert between the first and second bottles, the insert configured to inhibit flexing of one bottle without the other bottle to thereby help compensate for differences in pressure applied to one bottle relative to the other bottle such that the first and second bottles dispense more equally when the container is squeezed;
wherein the first and second bottles are configured such that when upright at least a portion of the first opening and at least a portion of the second opening extend over the insert.

31. A container comprising:
a first bottle having a first reservoir for holding a first liquid and a first opening for dispensing the first liquid from within the first reservoir;
a second bottle coupled to the first bottle, the second bottle having a second reservoir for holding a second liquid and a second opening for dispensing the second liquid from within the second reservoir; and
an insert between the first and second bottles, the insert configured to inhibit flexing of one bottle without the other bottle to thereby help compensate for differences in pressure applied to one bottle relative to the other bottle when the container is squeezed and help the first and second bottles dispense more equally;
wherein the insert includes lateral edges, upper and lower edges, and a middle portion, and wherein the insert is configured with a tapered thickness such that the insert is thicker along the lateral edges and thinner towards a middle portion, whereby the insert generally matches a contour of corresponding portions of the first and second bottles between which the insert is positioned.

32. The container of claim 30, wherein the insert is configured to allow mating of the first and second bottles without mating shapes therebetween, to allow bottle shapes that facilitate molding, and/or to reduce a seam between inner walls of the first and second bottles.

33. A container comprising:
a first bottle having a first reservoir for holding a first liquid and a first opening for dispensing the first liquid from within the first reservoir;
a second bottle coupled to the first bottle, the second bottle having a second reservoir for holding a second liquid and a second opening for dispensing the second liquid from within the second reservoir; and
an insert between the first and second bottles, the insert configured to inhibit flexing of one bottle without the other bottle to thereby help compensate for differences in pressure applied to one bottle relative to the other bottle when the container is squeezed and help the first and second bottles dispense more equally;
wherein:
the first bottle includes a first inner wall facing in a direction towards the second bottle and a first protruding portion;
the second bottle includes a second inner wall facing in a direction towards the first bottle and a second protruding portion that protrudes in a direction toward the first bottle;
the first protruding portion includes at least a portion of the first opening and protrudes in a direction toward the second bottle such that the at least a portion of the first opening overlaps the second inner wall of the second bottle; and
the second protruding portion includes at least a portion of the second opening and protrudes in a direction toward the first bottle such that the at least a portion of the second opening overlaps the first inner wall of the first bottle.

34. The container of claim 33, wherein:
each said first and second bottle includes a mating surface configured to accept a mating surface of the other bottle;
at least a portion of the mating surface of the first bottle is defined by the first protruding portion such that the at least a portion of the mating surface of the first bottle overlaps the second inner wall of the second bottle; and
at least a portion of the mating surface of the second bottle is defined by the second protruding portion such that the at least a portion of the mating surface of the second bottle overlaps the first inner wall of the first bottle.

35. The container of claim 33, wherein the openings of the first and second bottles are at least partially within both a first vertical plane defined by the first inner wall of the first bottle and a second vertical plane defined by the second inner wall of the second bottle.

36. A container comprising:
a first bottle having a first reservoir for holding a first liquid and a first opening for dispensing the first liquid from within the first reservoir;
a second bottle coupled to the first bottle, the second bottle having a second reservoir for holding a second liquid and a second opening for dispensing the second liquid from within the second reservoir; and
an insert between the first and second bottles, the insert configured to inhibit flexing of one bottle without the other bottle to thereby help compensate for differences in pressure applied to one bottle relative to the other bottle such that the first and second bottles dispense more equally when the container is squeezed;
wherein each said first and second bottle includes a mating surface configured to accept a mating surface of the other bottle with at least a portion of the mating surface extending over the insert when the first and second bottles are upright.

37. The container of claim 36, wherein the first and second bottles are configured such that when upright at least a portion of the first opening and at least a portion of the second opening extend over the insert.

38. A container comprising:
a first bottle having a first reservoir for holding a first liquid and a first opening for dispensing the first liquid from within the first reservoir;
a second bottle coupled to the first bottle, the second bottle having a second reservoir for holding a second liquid and a second opening for dispensing the second liquid from within the second reservoir; and
an insert between the first and second bottles, the insert configured to inhibit flexing of one bottle without the other bottle to thereby help compensate for differences in pressure applied to one bottle relative to the other bottle such that the first and second bottles dispense more equally when the container is squeezed;
wherein the first and second bottles are configured such that when upright their openings are side by side at least partially within a vertical plane through an axis of the container that extends between opposing sides of the container.

39. A container comprising:
a first bottle having a first reservoir for holding a first liquid and a first opening for dispensing the first liquid from within the first reservoir;
a second bottle coupled to the first bottle, the second bottle having a second reservoir for holding a second liquid and a second opening for dispensing the second liquid from within the second reservoir; and
an insert between the first and second bottles, the insert configured to inhibit flexing of one bottle without the other bottle to thereby help compensate for differences in pressure applied to one bottle relative to the other bottle such that the first and second bottles dispense more equally when the container is squeezed;
wherein the first and second bottles are configured such that their openings are side by side at least partially within a vertical plane through a longitudinal axis of the container when upright.

40. A container comprising:
a first bottle having a first reservoir for holding a first liquid and a first opening for dispensing the first liquid from within the first reservoir;
a second bottle coupled to the first bottle, the second bottle having a second reservoir for holding a second liquid and a second opening for dispensing the second liquid from within the second reservoir; and
an insert between the first and second bottles, the insert configured to inhibit flexing of one bottle without the other bottle to thereby help compensate for differences in pressure applied to one bottle relative to the other bottle such that the first and second bottles dispense more equally when the container is squeezed;
wherein each said first and second bottle includes a measuring well, the first and second bottles are configured such that when upright at least a portion of the measuring well of one bottle extends over the inner wall of the other bottle.

41. A container comprising:
a first bottle having a first reservoir for holding a first liquid and a first opening for dispensing the first liquid from within the first reservoir;
a second bottle coupled to the first bottle, the second bottle having a second reservoir for holding a second liquid and a second opening for dispensing the second liquid from within the second reservoir; and
an insert between the first and second bottles, the insert configured to inhibit flexing of one bottle without the other bottle to thereby help compensate for differences in pressure applied to one bottle relative to the other bottle such that the first and second bottles dispense more equally when the container is squeezed;
a first conduit extending into the first reservoir;
a first measuring well in communication with the first opening and the first conduit for receiving the first liquid from the first reservoir via the first conduit;
a second conduit extending into the second reservoir;
a second measuring well in communication with the second opening and the second conduit for receiving the second liquid from the second reservoir via the second conduit;
whereby the first and second liquids are caused to flow through the respective first and second conduits and into the corresponding first and second measuring wells when the container is squeezed.

42. A container comprising:
a first bottle having a first reservoir for holding a first liquid and a first opening for dispensing the first liquid from within the first reservoir;
a second bottle coupled to the first bottle, the second bottle having a second reservoir for holding a second liquid and a second opening for dispensing the second liquid from within the second reservoir; and
an insert between the first and second bottles, the insert configured to inhibit flexing of one bottle without the other bottle to thereby help compensate for differences in pressure applied to one bottle relative to the other bottle such that the first and second bottles dispense more equally when the container is squeezed;
wherein:
the first bottle is configured to dispense a first predetermined measured quantity of the first liquid, such that liquid in excess of the first predetermined measured quantity flows from the first measuring well back through the first conduit into the first reservoir; and
the second bottle is configured to dispense a second predetermined measured quantity of the second liquid, such that liquid in excess of the second predetermined measured quantity flows from the second measuring well back through the second conduit into the second reservoir; and
whereby the container is operable for dispensing the first and second predetermined measured quantities of the respective first and second liquids, which first and second predetermined measured quantities may be equal or unequal parts of the same liquid or different liquids.

43. The container of claim 30, wherein each said first and second bottle includes a measuring well, and wherein each of the first and second measuring wells is configured with excess space above a predetermined level to allow filling of the first and second measuring wells to their predetermined levels even if pressure applied to the first and second bottles is unequal causing one measuring well to fill faster than the other measuring well without overflow or spillage of liquid from the measuring well that fills faster.

44. The container of claim 30, wherein:
the insert is configured to help retain the first and second bottles together; and/or
the container is configured to dispense measured amounts of first and second liquids from the reservoirs of the respective first and second bottles; and/or
the first and second bottles are moldable; and/or
the first and second bottles are configured such that their openings are spaced apart from each other along a longitudinal axis of the container; and/or the first and second bottles are configured such that their openings are centered on a longitudinal axis of the container; and/or the container includes a front wall, a back wall, and an ergonomic configuration that allows a user of the container when dispensing to place a thumb on the front wall and fingers on the back wall or a thumb on the back wall and fingers on the front wall.

45. The container of claim 7, wherein each said first and second bottle includes a measuring well, the first and second bottles are configured such that when upright at least a portion of the measuring well of one bottle overlaps the inner wall of the other bottle.

46. The container of claim 7, wherein:
the first and second bottles are configured such that their openings are side by side at least partially within a vertical plane through an axis of the container that extends between opposing sides of the container when upright, which vertical plane passes through at least a portion of the mating surfaces of the first and second bottles;
the container includes a front wall and a back wall; and
the axis is generally centrally located between the front and back walls of the container.

47. The container of claim 7, wherein the first and second bottles are configured such that their openings are side by side at least partially within a vertical plane through an axis of the container that extends between opposing sides of the container when upright, which vertical plane passes through at least a portion of the mating surfaces of the first and second bottles; and
wherein the container includes a front wall and a back wall; and
wherein:
the vertical plane is generally equidistant from the front and back walls of the container; and/or
the vertical plane is generally parallel to front and back walls of the container; and/or
the vertical plane is generally perpendicular to the opposing sides of the container.

48. The container of claim 7, wherein:
each said first and second bottle is configured such that the body includes a longitudinal centerline axis, a lateral centerline axis, and a vertical centerline axis, and such that the opening is offset from the longitudinal, lateral, and vertical centerline axes of the body when the bottle is upright; and
the openings of the first and second bottles are offset from a lateral centerline axis and a vertical centerline line axis of the container when upright.

49. The container of claim 7, wherein:
the first and second bottles are configured such that their openings are side by side at least partially within a vertical plane through an axis of the container that extends between opposing sides of the container when upright, which vertical plane passes through at least a portion of the mating surfaces of the first and second bottles; and
the vertical plane comprises a vertical bisecting plane through the container when upright.

50. The container of claim 7, wherein the openings of the first and second bottles are at least partially within both a first vertical plane coincident with an inner wall of the first bottle and a second vertical plane coincident with an inner wall of the second bottle.

51. The container of claim 7, wherein:
at least a portion of the opening of the first bottle overlaps the inner wall of the second bottle;
at least a portion of the opening of the second bottle overlaps the inner wall of the first bottle; and
the outer walls of the first and second bottles are configured to allow a user of the container when dispensing to place a thumb on the outer wall of one of the first and second bottles and to place fingers on the outer wall of the other one of the first and second bottles.

52. The container of claim 51 wherein each said first and second bottle includes a protruding portion that protrudes in a direction toward the other bottle, the protruding portion including the at least a portion of the opening that overlaps the inner wall of the other bottle, and the protruding portion defining at least a portion of the mating surface such that the at least a portion of the mating surface of one bottle overlaps the inner wall of the other bottle.

53. The container of claim 7, wherein:
the container is configured to dispense measured amounts of first and second liquids from the reservoirs of the respective first and second bottles; and/or
the first and second bottles are moldable; and/or
the first and second bottles are configured such that their openings are spaced apart from each other along a longitudinal axis of the container; and/or
the first and second bottles are configured such that their openings are centered on a longitudinal axis of the container; and/or
the container includes a front wall, a back wall, and an ergonomic configuration that allows a user of the container when dispensing to place a thumb on the front wall and fingers on the back wall or a thumb on the back wall and fingers on the front wall.

54. A container comprising:
a first bottle having a first reservoir for holding a first liquid and a first opening for dispensing the first liquid from within the first reservoir;
a second bottle coupled to the first bottle, the second bottle having a second reservoir for holding a second liquid and a second opening for dispensing the second liquid from within the second reservoir; and
each said first and second bottle comprising an inner wall facing in a direction towards the other bottle, the inner walls of the first and second bottles reinforced by ribs that are configured to inhibit flexing of one bottle without the other bottle to thereby help compensate for differences in pressure applied to one bottle relative to the other bottle when the container is squeezed and help the first and second bottles dispense more equally;
wherein the first and second bottles are configured such that when upright at least a portion of the first opening of the first bottle extends over the inner wall of the second bottle and at least a portion of the second opening of the second bottle extends over the inner wall of the first bottle.

55. The container of claim 54, wherein each said first and second bottle includes a mating surface configured to accept a mating surface of the other bottle, and with at least a portion of the mating surface overlapping the inner wall of the other bottle.

56. The container of claim 54, wherein:
the first bottle includes a first body defining the first reservoir;
the first opening includes at least a portion outside a perimeter of the first body defining the first reservoir as viewed from above when the container is upright;
the second bottle includes a second body defining the second reservoir; and the second opening includes at least a portion outside a perimeter of the second body defining the second reservoir as viewed from above when the container is upright.

57. A container comprising:

a first bottle having a first reservoir for holding a first liquid and a first opening for dispensing the first liquid from within the first reservoir;

a second bottle coupled to the first bottle, the second bottle having a second reservoir for holding a second liquid and a second opening for dispensing the second liquid from within the second reservoir; and an insert between the first and second bottles, the insert configured to inhibit flexing of one bottle without the other bottle to thereby help compensate for differences in pressure applied by to one bottle relative to the other bottle when the container is squeezed and help the first and second bottles dispense more equally;

wherein each said first and second bottle comprises an inner wall facing in a direction towards the other bottle, the inner walls of the first and second bottles reinforced by ribs that are configured to inhibit flexing of one bottle without the other bottle to thereby help compensate for differences in pressure applied to one bottle relative to the other bottle when the container is squeezed and help the first and second bottles dispense more equally.

58. The container of claim 54, wherein:

each said first and second bottle includes a mating surface configured to accept a mating surface of the other bottle; and the first and second bottles are configured such that their openings are side by side at least partially within a vertical plane through an axis of the container that extends between opposing sides of the container when upright, which vertical plane passes through at least a portion of the mating surfaces of the first and second bottles.

59. The container of claim 54, wherein each said first and second bottle includes a measuring well, and the first and second bottles are configured such that when upright at least a portion of the measuring well of one bottle extends over the inner wall of the other bottle.

* * * * *